(12) United States Patent
Voiss et al.

(10) Patent No.: US 12,258,147 B2
(45) Date of Patent: Mar. 25, 2025

(54) AUTO-LOCATING AND AUTONOMOUS OPERATION DATA STORAGE

(71) Applicant: Wilder Systems Inc., Austin, TX (US)

(72) Inventors: Spencer Voiss, Austin, TX (US); William Wilder, Austin, TX (US)

(73) Assignee: WILDER SYSTEMS INC., Austin, TX (US)

( * ) Notice: Subject to any disclaimer, the term of this patent is extended or adjusted under 35 U.S.C. 154(b) by 0 days.

(21) Appl. No.: 18/477,422

(22) Filed: Sep. 28, 2023

(65) Prior Publication Data

US 2024/0101278 A1  Mar. 28, 2024

Related U.S. Application Data

(63) Continuation of application No. 18/339,199, filed on Jun. 21, 2023, now Pat. No. 11,807,400.

(Continued)

(51) Int. Cl.
*B64F 5/40* (2017.01)
*B25J 5/00* (2006.01)
(Continued)

(52) U.S. Cl.
CPC ...... *B64F 5/40* (2017.01); *B25J 5/00* (2013.01); *B25J 5/007* (2013.01); *B25J 9/1664* (2013.01);
(Continued)

(58) Field of Classification Search
CPC ...... B64F 5/40; B25J 5/00; B25J 5/007; B25J 9/1664; B25J 9/1666; B25J 9/1694;
(Continued)

(56) References Cited

U.S. PATENT DOCUMENTS 6,587,752 B1   7/2003  Saito
11,807,400 B1  11/2023 Voiss et al.
(Continued)

FOREIGN PATENT DOCUMENTS

WO   2022170279 A1   8/2022

OTHER PUBLICATIONS

Oridate, "Velocity-Based Robot Motion Planner for Under-Constrained Trajectories with Part-Specific Geometric Variances", The University of Texas, Dec. 2021, 178 pages.

(Continued)

*Primary Examiner* — Michael V Kerrigan
(74) *Attorney, Agent, or Firm* — Kilpatrick Townsend & Stockton LLP

(57) ABSTRACT

Techniques for auto-locating and autonomous operation data storage are disclosed. An example method can include storing a representation of an aircraft in a data storage of the computing system. The representation and instructions for performing a first operation on the aircraft can be transmitted to a first robot. The first robot can be configured to identify the aircraft based on a first feature of the representation. The method can further include receiving sensor data. The method can further include transmitting the sensor data to an analysis service to identify a state of a part of the aircraft. The method can further include storing the analysis in the data storage. The method can further include generating second instructions for performing a second operation on the aircraft based on the analysis and the representation stored in the data storage.

20 Claims, 10 Drawing Sheets

Related U.S. Application Data

(60) Provisional application No. 63/482,491, filed on Jan. 31, 2023, provisional application No. 63/481,578, filed on Jan. 25, 2023, provisional application No. 63/354,219, filed on Jun. 21, 2022.

(51) Int. Cl.
| | | |
|---|---|---|
| *B25J 9/16* | (2006.01) | |
| *G05B 19/4155* | (2006.01) | |
| *G05D 1/00* | (2006.01) | |
| *G05D 1/249* | (2024.01) | |
| *G06T 7/60* | (2017.01) | |
| *G06T 7/73* | (2017.01) | |
| *G07C 5/00* | (2006.01) | |
| *G07C 5/08* | (2006.01) | |

(52) U.S. Cl.
CPC .......... *B25J 9/1666* (2013.01); *B25J 9/1694* (2013.01); *G05B 19/4155* (2013.01); *G05D 1/0231* (2013.01); *G05D 1/249* (2024.01); *G06T 7/60* (2013.01); *G06T 7/74* (2017.01); *G07C 5/008* (2013.01); *G07C 5/085* (2013.01); *G05B 2219/40269* (2013.01); *G06T 2200/04* (2013.01); *G06T 2207/10028* (2013.01); *G06T 2207/20081* (2013.01); *G06T 2207/20084* (2013.01)

(58) Field of Classification Search
CPC ...... G05B 19/4155; G05B 2219/40269; G05D 1/0231; G05D 1/249; G06T 7/60; G06T 7/74; G06T 2200/04; G06T 2207/10028; G06T 2207/20081; G06T 2207/20084; G07C 5/008; G07C 5/085
See application file for complete search history.

(56) References Cited

U.S. PATENT DOCUMENTS

| | | |
|---|---|---|
| 11,880,995 B2 | 1/2024 | Voiss et al. |
| 2016/0264262 A1* | 9/2016 | Colin .................... B25J 19/023 |
| 2018/0275632 A1 | 9/2018 | Zhang et al. |
| 2019/0147221 A1 | 5/2019 | Grabner et al. |
| 2019/0314990 A1 | 10/2019 | Sugaki et al. |
| 2021/0232141 A1 | 7/2021 | Georgeson et al. |
| 2022/0100177 A1 | 3/2022 | Johnston et al. |
| 2022/0134561 A1 | 5/2022 | Graham et al. |
| 2022/0276629 A1 | 9/2022 | Wilder |

OTHER PUBLICATIONS

PCT/US2024/013339, "International Search Report and Written Opinion", Jul. 1, 2024, 17 pages.

* cited by examiner

AUTO-LOCATING AND AUTONOMOUS OPERATION DATA STORAGE

CROSS-REFERENCES TO RELATED APPLICATIONS

This application is a continuation of Ser. No. 18/339,199, filed Jun. 21, 2023, which claims priority under 35 U.S.C. § 119(e) to U.S. Provisional Application No. 63/354,219, filed on Jun. 21, 2022, U.S. Provisional Application No. 63/481,578, filed on Jan. 25, 2023, and U.S. Provisional Application No. 63/482,491, filed on Jan. 31, 2023, the contents of which are herein incorporated by reference.

BACKGROUND

Industrial robotics is an expanding field for various industries that want to improve their internal and customer-facing processes. Industrial robots can be fabricated and programmed to perform various tasks for different applications. This customizability has led many enterprises to expand the incorporation of robots from manufacturing to other processes to improve the safety and the efficiency of the enterprise's workers.

BRIEF DESCRIPTION OF THE DRAWINGS

Various embodiments in accordance with the present disclosure will be described with reference to the drawings in which.

DETAILED DESCRIPTION

Figure 1:
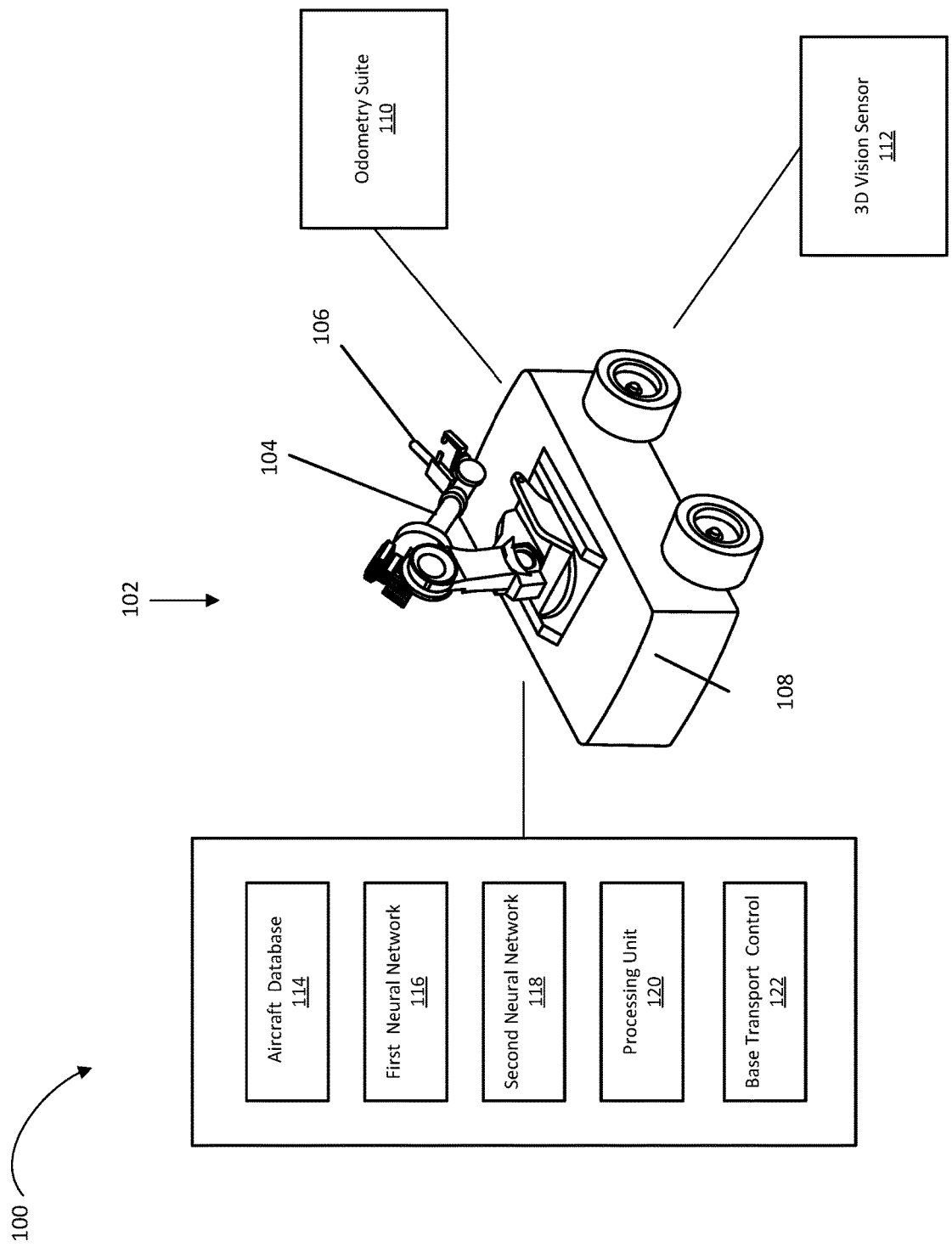
FIG. 1 is an illustration of a robot configured for auto-locating and positioning relative to an aircraft, according to one or more embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Aircraft fasteners are mechanical devices that are used to assemble two or more aircraft parts into assemblies that form the aircraft. Engineers consider various factors, such as shear stress and aircraft load, when considering a type of fastener and the number of fasteners for each assembly. A fastener can vary from another fastener based on diameter, material, and shape. The fasteners are inserted into holes that are arranged through the aircraft parts. As aircraft age or incur damage, the aircraft's damaged or worn part needs to be removed and replaced with new parts.

As aircraft servicing entities transition to robotic labor to perform these tasks, there is an increased need for automation of these tasks. Multiple aircraft can be located in a maintenance hangar and each aircraft may need to be serviced. However, to automate this process a robot needs the capability to distinguish an aircraft from other objects (e.g., other aircraft, equipment) in the hangar, and to move toward the aircraft without causing damage. To compound this issue, aircraft can be moved into and out of a hangar as the aircraft flight schedule permits. For example, a military aircraft can land at one enclosure and have limited time available for inspection and maintenance based on the pilot's mission parameters. Conventional object detection methods can provide limited support as the robot may have no prior knowledge as to which aircraft is going to land at the robot's enclosure and where the aircraft will land. Furthermore, the robot may need to determine the six degrees of freedom position of the aircraft without this prior knowledge to perform the inspection.

Embodiments described herein addressed the above-referenced issues via a robot that can be deployed to an enclosure without any prior knowledge of the enclosure, or any aircraft situated at the enclosure. The robot can collect enclosure data using a combination of odometry systems and three-dimensional vision sensors (e.g., light detection and ranging (LiDAR) sensors) in real-time. The robot can use the collected data to identify a target aircraft and navigate to the target aircraft. For example, a robot can be deployed to a hangar that includes one or more objects (e.g., aircraft, machinery, portable housing). The robot can scan the hangar to generate a three-dimensional point cloud of the inside of the hangar. The point cloud data can be preprocessed to generate inputs for a first neural network. The first neural network can extract features from the point cloud data that can be used to distinguish the target aircraft from other objects in the hangar. The features can be geometric patterns from the point cloud that can be used to distinguish the target aircraft from the rest of the objects in the hangar. The identified features can be preprocessed for use as inputs in a second neural network. The second neural network can compare the identified features to features from a reference model (e.g., reference frame) of the target aircraft. For example, the second neural network can compare the identified features from the hangar to the features found in the reference model to determine if there is a match. Through this comparison, the robot can detect a candidate target object.

Upon identification of a candidate target aircraft, the robot can begin to move forward toward the candidate target aircraft. As the robot moves forward, the robot can repeat the above-described process by generating new point cloud data, extracting features from the point cloud, and comparing the features to the reference model of the target aircraft. By doing so, the robot can verify that the candidate target aircraft is the target aircraft. For example, if the robot is approaching closer to the candidate aircraft detects that a threshold number of features do not match the preconfigured model, the robot can cease treating the object as a candidate target aircraft and identify another candidate target aircraft. The robot can then repeat the above-described process with respect to the new candidate target object.

In addition to collecting point cloud data and comparing the data to a reference model, the robot can collect data from odometry systems (e.g., laser-based sensors, gyroscopes, accelerometers, software). An odometry suite can be used to determine a change in position over time (e.g., how far the robot has traveled, which direction the robot has traveled). By using the combined point cloud data and the odometry data, the robot can identify a candidate target object, move toward the candidate target object, verify that the candidate target object is the target object, and stop in a position close enough to the target object to perform some autonomous operation. It should be appreciated that once the robot is close enough to the target object, additional processes may be performed in furtherance of a task. For example, if the task is fastener removal, the robot, once stopped in front of the target object, can retrieve a model (e.g., a data structure) of a panel, including fastener positions and fastener types. The robot can scan the target object to identify the panel based on a comparison with the model, register the panel to the robot, and remove one or more of the fasteners.

The embodiments described below are described with reference auto-locating and positioning for fastener installation, removal, and replacement. It should be appreciated that the functionality described herein can be applied to various applications that involve a robot that identifies a target object and traverses a surface to reach that object, such as decontamination, painting, washing, and drilling.

FIG. 1 is an illustration 100 of a robot configured for auto-locating and positioning relative to an aircraft, according to one or more embodiments. The robot 102 can include a robotic arm 104 that is programmable to perform comparably to a human arm. For example, the robotic arm can be an articulated robot that includes a series of joints that can move with multiple degrees of freedom. The robot 102 can further include an end effector 106, which can be a device used to interact with an object in the enclosure (e.g., an aircraft). The end effector 106 can be modular, such that it can be replaced with another end effector based on a task. In some embodiments, the robot 102 can include multiple end effectors connected to an end joint of the robotic arm 104. The robot 102 can further include a transport mechanism 108, for example, a base with wheels. In other embodiments, the robot 102 can include a base and track system, similar to a tank. In other embodiments, the robot can be 102 be another form of robot, such as a gantry robot with a transport mechanism.

The robot 102 can further include sensors and software that in combination can permit the robot to identify a target object and advance toward the target. The sensors can include an odometry suite 110, which can include one or more motion sensors for detecting a change in position over time. Odometry systems can include, for example, gyroscopes, accelerometers, inertial measurement unit (IMU) sensors, wheel encoders, and visual inertial odometry (VIO) software. As the robot 102 moves, the odometry suite 110 can collect data to allow the robot 102 to incrementally navigate through the enclosure, pose after pose to both reach a target object and to avoid collisions with other objects. For example, as a robot moves through an aircraft hangar, the robot can be guided by one or more odometry sensors of an odometry suite that provide a position relative to a starting position, the target object, and other objects in the hangar.

The robot 102 can further include a 3D vision sensor 112. The 3D vision sensor 112 can collect data from the enclosure surrounding the robot to create an initial map of the surrounding enclosure. The 3D vision sensor can emit a signal and collect signals reflected from the surface of the objects in the enclosure to create real-time multi-dimensional mapping of the surrounding enclosure. The multi-dimensional mapping can be in the form of a point cloud and include the target object and any surrounding objects. For example, in the context of an aircraft hangar, the point cloud can include data points for the surface of the target aircraft, and any other objects in the hangar (e.g., other aircraft, machinery, the walls of the hangar). The point cloud data can be processed to identify a target object, estimate a relative position of the robot to the target object, and generate a path from the starting position of the robot 102 to the target object. In some embodiments, rather than a 3D vision sensor 112, the robot 102 can include other sensors operable to collect data used to create a mapping of the ambient environment, such as radar, stereo camera, or other appropriate sensor. The robot 102 can be configured to continuously update a path from a starting point to the target object.

The robot 102 can use various algorithms to generate a path to the target object. For example, the robot 102 can employ a rapidly-exploring random trees (RRT) algorithm, a probabilistic roadmap (PRM), or other appropriate algorithm. The path can be configured to be performable by the robot 102 and optimized to be the shortest distance from an initial starting point to the target object that the robot 102 can travel while avoiding collisions. In general, the robot 102 can use the multi-dimensional representation to calculate a map that includes a starting position of the robot 102 and the position of an area that includes the target object. The map can be partitioned into a free region, where the robot 102 is free to move about and an obstacle region, in which the robot 102 would collide with some obstacle.

The robot 102 can initialize a data structure, such as a tree, in which the parent node can represent the starting position of the robot 102. The robot 102 can then create a node associated with a random position on the map. The robot 102 can then find a node that has the nearest position to the newly created node. Initially, this is the parent node that represents the starting position of the robot 102. The robot 102 can then determine a path from the starting position to the random position, in which the robot 102 avoids collisions. The robot 102 can then insert the node into the data structure as a child node of the parent node representing the starting position of the robot 102. The robot 102 can keep repeating this process until it creates a node that is within a threshold distance of the target object. Each newly created node can be a child node of a nearby node. As the robot 102 has created a node within the threshold distance of the target object, the robot 102 can traverse the tree from the node closest to the target object back to the parent node representing the starting position of the robot 102. This can be a path that the robot 102 follows to reach the target object.

During the course of the initial path to the target destination, the robot 102 can redetermine the path or determine that a candidate target object is not the target object. For example, the path from the starting point to the target object can be divided into stages, in which the robot collects data from the odometry suite 110 and the 3D vision sensor 112 at each stage. The robot 102 can then recalculate the path at each stage to optimize the selected path (e.g., reduce distance, avoid collision). Therefore, each of the odometry suite 110 and the 3D vision sensor 112 can be configured to continuously collect data from the robot's starting point until it reaches the destination.

In addition to the sensors, the robot 102 can include one or more software instances to enable the robot 102 to identify the target object, and incrementally navigate a path to the target object. It should be appreciated that one or more examples of the software functionality can be computationally expensive, and in some instances, some of the software computations are performed externally in a server.

The robot 102 can include an aircraft database 114 that can include one or more reference models of aircraft. The one or more reference models can include one or more target aircraft. The reference model can be a multi-dimensional representation of the target aircraft. For example, the reference model can be a point cloud representation of the target aircraft. The reference model can include one or more features of the target aircraft that can be used to distinguish the target aircraft from the aircraft. The features can be geometric features that are associated with an aircraft. For example, certain aircraft are twin tail aircraft, in that the vertical stabilizer arrangement includes two rear stabilizers. These stabilizers can include twin contours of geometric features. Therefore, to distinguish a twin tail aircraft from a single tail aircraft, a computing system can receive the reference model of the twin tail aircraft. Based on the reference model, the computing system can identify features associated with the twin tail aircraft. The robot 102 can further receive a point cloud of an enclosure that includes a twin tail aircraft. The robot 102 can further identify one or more features from the reference model, and scan the point cloud for matching features. Based on determining a match, the robot 102 can identify the object that has the same features as a candidate target object. The robot 102 can move toward the candidate target object and collect data to generate another point of the enclosure. The robot 102 can reuse the features identified in the reference model to match with objects in the new point cloud. If the features identified in the reference model continue to match with the features of the target object of the new point cloud, the robot 102 can continue to move toward the target object. If, however, the features identified in the reference model do not match with the features of the target object of the new point cloud, the robot 102 can reanalyze the point cloud to identify features matching features in the reference model.

In some instances, the robot 102 can adjust its position, (e.g., move back to the starting position or some other position) to perform the scan. For example, if the robot 102 is unable to match a threshold number of features from the reference model to the point cloud of the enclosure, the robot 102 can adjust its position and collect new data for a new point cloud. The robot 102 can then attempt to match features identified in the reference model to the new point cloud of the enclosure. The robot 102 can continue to adjust its position unit a threshold number of features of the reference model, and match the features extracted from the point cloud of the enclosure.

The aircraft database 114 can be organized to permit the robot 102 to access or receive a reference model of the target aircraft, preferably a reference model of the target aircraft itself. As each aircraft can include unique features (e.g., fastener positioning, one aircraft includes a replacement part that another aircraft does not), the aircraft database 114 can be organized not only on individual aircraft type, but on individual aircraft. For example, reference models can be organized based on an aircraft type and suborganized based on a tail number. Therefore, if the aircraft database 114 does not include a reference model of the individual target aircraft, it can provide a reference model of a same type of aircraft.

The aircraft database 114 can be stored on the robot 102 or on an external computing system, such as a server. For example, in conjunction with providing the robot 102 with instructions to perform an autonomous operation on the target aircraft, a reference model of the target aircraft can be retrieved from a local database of aircraft reference models stored on the robot 102. In other instances, the aircraft database 114 can be stored externally from the robot 102. In these instances, the robot can either be provided a reference model of the target aircraft or provided instructions for retrieving the reference model from the aircraft database 114.

The robot 102 can be deployed to an enclosure without a directional mapping to the target object. Therefore, the robot 102 can use the above referenced systems and sensors to generate a multi-dimensional representation of the enclosure. The aircraft database 114 can provide a reference model to distinguish the target object from the rest of the enclosure. For example, the robot 102 can be deployed to an enclosure for performing operations on a target aircraft. In some instances, the robot 102 may have no prior knowledge of either the enclosure or the target aircraft. Therefore, the reference model of the target aircraft can be used to match features from the enclosure to features of the target aircraft.

The robot 102 can include a first neural network 116 for extracting features from point cloud data. For example, the 3D vision sensor 112 can collect data representing an enclosure (e.g., a hangar), and the data can be used to generate input data for the first neural network. The first neural network 116 can be an artificial neural network (ANN) and include any neural network operable to receive data (e.g., time-based data), and identify one or more features. In some embodiments, the first neural network 116 can include a set of neural networks that are configured to perform a task (e.g., feature identification). For example, the first neural network can include a combination of neural networks including one or more of a CNN, a multilayer perceptron (MLP), a neural radiance field (NeRF) network.

Prior to receiving the input data generated from the point cloud data, the first neural network 116 can be trained for general object detection. The first neural network 116 can be pre-trained for object detection from point cloud data using various supervised learning techniques. Afterwards, the first neural network 116 can be fine-tuned for object detection as related to aircraft. For example, the first neural network 116 can ingest training data, which can include examples of point cloud data of one or more aircraft. The first neural network 116 can repeatedly be fed the training data until it can accurately identify respective geometric features associated with different aircraft.

In some embodiments, the first neural network 116 can receive data identifying key features of a target aircraft. The key features can be stored in a database of aircraft and associated features. The features can include geometric features, dimensions, associated weights, and other appropriate data. The first neural network 116 can receive a description of an aircraft, for example, a tail number or an aircraft type. Based on the description, the first neural network 116 can retrieve features associated with the aircraft.

The robot 102 can further include a second neural network 118 for determining whether the features identified by the first neural network 116 are associated with the target aircraft. The first neural network 116 can rely on the point cloud data of the enclosure to identify features in the data.

The second neural network 118 can compare the features identified by the first neural network 116 with the reference model of the aircraft database 114. Therefore, where the first neural network 116 can identify features that ease the task of identifying the target aircraft, the second neural network 118 can identify the target aircraft.

The second neural network 118 can receive data generated from the output layer of the first neural network 116. For example, the second neural network 118 can receive the features that are identified by the first neural network 116. The second neural network 118 can apply various methods to match the reference model to an object from the point cloud. For example, the second neural network 118 can apply point-to-point method, a point-to-mesh method, a mesh-to mesh method, or other appropriate method. The point cloud can be a set of data points generated from the 3D vision sensor, such as LiDAR data in a given coordinate system. The mesh can be composed of polygons, whose vertices are the data points of the point cloud. The point-to-point method can include detecting the distance between points from the point cloud and distances between the data points in the reference model. The reference model can be matched to an object from the point cloud based on the similarities between the distances of the data points. For point-to-mesh method, approximation methods can be used to approximate the distances between the points of the reference model and the changes to the surface of the mesh. The target aircraft can be identified based on a similarity of the distances between points of the reference model and changes to the surface of an object of the point cloud. For mesh-to mesh methods, changes to the surface of the reference model can be compared to changes in the surface of the objects from the point cloud. A target aircraft can be identified based on the similarity between the changes to the surface of the reference model and changes to the surface of an object of the point cloud.

The second neural network 118 can also be an artificial neural network (ANN), for example, a CNN, a LSTM network, a GRU network.

The second neural network 118 can be pre-trained for generally comparing identified features with point cloud data with features of known objects. The second neural network 118 can then be fine-tuned for object detection as related to aircraft. For example, the second neural network 118 can ingest training data, which can include examples of point cloud data of one or more aircraft. The second neural network 118 can further be provided reference models describing different types of aircraft. The second neural network 118 can be trained to match the identified features with features identified in the reference model. In the instance that the second neural network 118 determines that an object includes a threshold number of matching features, the second neural network 118 can identify the object as a candidate target aircraft.

The robot 102 can include a processing unit 120, which can include electrical circuitry for executing instructions. As indicated above, the functionality described here can be performed locally at the robot, or in some instances, at a remote server. For example, if the processes are too computationally expensive, they can be performed at the server. The processing unit 120 can receive data from the odometry suite 110 and the 3D vision sensor 112. The processing unit 120 can further retrieve a reference model from the aircraft database for comparison with the data collected from the 3D vision sensor 112. The processing unit 120 can implement the first neural network 116 and the second neural network 118 to assist in identifying a target aircraft. For example, the processing unit 120 can use the first neural network 116 to identify features from point cloud data that can be used to identify the target aircraft. The processing unit 120 can then use a second neural network to compare the objects found in a point cloud to a reference model retrieved from the aircraft database 114. The processing unit 1020 can identify a target aircraft and a relative position of the aircraft. The processing unit 120 can further receive data from the odometry suite 110 and control the motion of the robot 102 via base transport control 122 to reach the target aircraft.

The base transport control 122 can include a combination of software, hardware, and transport mechanisms (e.g., motors, wheels, tracks). The processing unit 120 can receive data collected from the odometry suite 110, including one or more of gyroscopes, accelerometers, inertial measurement unit (IMU) sensors, wheel encoders, and visual inertial odometry (VIO) sensors. The processing unit 120 can use the collected data to incrementally navigate to the target aircraft and avoid collisions with other objects. For example, processing unit 120 can transmit control instructions to the base transport control 122 to move forward, backwards, turn left, turn right, or remain stationary in order to reach the target aircraft without colliding with an obstacle. It should be appreciated that these movements can be calculated in real-time as the robot 102 may not be provided an environment of the target aircraft prior to being deployed at the area the aircraft is located or to be located.

Figure 2:
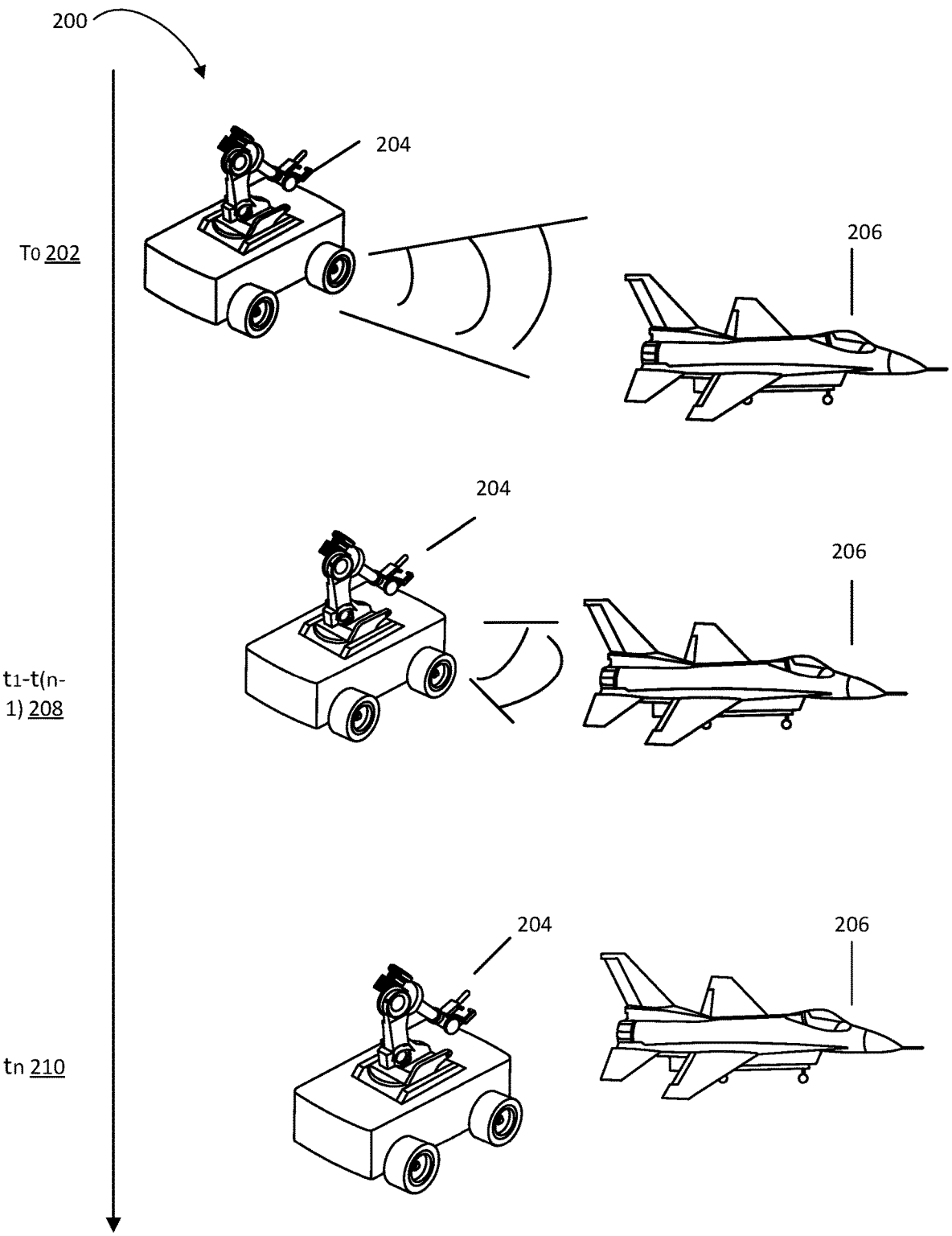
FIG. 2 is an illustration of auto-locating and movement relative to an aircraft, according to one or more embodiments.

FIG. 2 is an illustration 200 of auto-locating and movement relative to an aircraft, according to one or more embodiments. FIG. 2 assists in illustrating the iterative nature of the auto-locating and movement relative to an aircraft. At to 202, the robot 204 can collect data for generating a multi-dimensional representation of an enclosure. For example, the robot 204 can be deployed to a remote enclosure, such as a hangar, a temporary runway, an aircraft carrier to perform an autonomous operation on a target aircraft. The target aircraft can already be at the enclosure or arrive at a later time from the robot's arrival. In each situation, the robot 202 is not pre-configured with the target aircraft's environment or where the target aircraft will eventually be (e.g., the target aircraft arrives after the robot 202). The robot 202 can collect data to generate the multi-dimensional representation of the enclosure by, for example, using a 3D vision sensor to collect data for generating a point cloud of the enclosure. The point cloud can include data points of objects in the enclosure, including the target object, other aircraft and structures.

The robot 204 can send the collected data to a processing unit to identify the target aircraft 206. The processing unit can be local to the robot, or at an external computing service, such as a server. The processing unit can extract features from the point cloud that can be used to identify the target object. The features can be geometric features that are found at the target aircraft 206. In some instances, the processing unit can further retrieve a set of features that are more likely to be found at the target aircraft 206. For example, the processing unit can retrieve a set of features associated with the target aircraft 206 and use that set of features to narrow the search set of features. In some instances, the processing unit employs a first neural network to identify the features associated with the target aircraft 206 from the point cloud.

Once the processing unit identifies the features associated with the target aircraft 206, the processing unit can use the features to identify a candidate target aircraft from the point cloud. For example, the processing unit can retrieve a reference model of the target aircraft from an aircraft database. The reference model can provide a six degrees of freedom position for features of the target aircraft 206. The processing unit can use the reference model to compare with the point cloud data to identify candidate target aircraft. The processing unit can use the six degrees of freedom position of the identified features to compare with the six degrees of freedom position of features of the reference model to determine a match with an object from the point cloud. In some embodiments, the processing unit can use a second neural network to compare the identified features from the first neural network with features of a reference model.

In response to identifying the candidate target aircraft, the processing unit can register a coordinate system of the candidate target aircraft to a coordinate system of the robot 204. In particular, the processing unit can calculate a transformation from the coordinate system of the candidate target aircraft 206 to the coordinate system of the robot 204.

At $t_1$-$t_{(n-1)}$, the processing unit can determine a path for the robot to reach the target aircraft 206 based on the registration. The processing unit can determine the path and transmit control instructions to a base transport control to effectuate the instructions. The control instructions can include a direction for the robot 204 to move toward the target aircraft 206. As the robot 204 is moving, the processing unit can collect data via an odometry suite to track the motion of the robot toward the target aircraft 206 and in relation to a starting position of the robot 204. In addition to collecting data from the odometry suite, a 3D vision sensor can be configured to continuously collect data to generate a new point cloud. For example, the 3D vision sensor can be configured to collect data for a new point cloud every "x" milliseconds.

In response to generating a new point cloud based on new 3D vision sensor, the processing unit can verify that the candidate target object is still a valid candidate target aircraft. For example, the processing unit can reemploy the first neural network to extract features of the candidate target aircraft from the new point cloud. The processing unit can then reemploy the second neural network to compare the features of the reference model to the features of the candidate target aircraft. If the processing unit determines that the candidate target aircraft no longer includes a threshold number of features that match the reference model, the processing unit can disqualify the candidate target aircraft as a viable candidate and rescan the enclosure for a new candidate target aircraft.

If the processing unit determines that the candidate target aircraft is still a viable candidate target aircraft, the processing unit can calculate a new path to the candidate target aircraft. The new path can be based on the current enclosure of the robot 204. For example, based on the odometry suite data, the processing unit can determine a current position of the robot 204 in relation to the candidate target aircraft. The enclosure can be a dynamic enclosure, in which people and machinery can be moving about. Therefore, if the processing unit detects an object in the previously calculated path, the processing unit can calculate a new path to the candidate target aircraft.

The process can be iteratively repeated from $t_1$ to $t_{(n-1)}$ unit the robot 204 reaches the target aircraft 206. The number of steps from $t_1$ to $t_{(n-1)}$ can be based on the frequency upon which the processing unit is configured to collect a new point cloud and calculate a new path.

At $t_n$ 210, the robot 204 has reached the target aircraft 206. The processing unit can determine that the candidate target aircraft is the target aircraft 206 based on various methods. For example, in the instance that the processing unit verifies a threshold number of consecutive times that the candidate target aircraft is a viable candidate target aircraft based on a comparison with the reference model. In other instances, the processing unit determines that the candidate target aircraft is the target aircraft based on a number of features of each object from the point cloud that match the features for the reference model. For example, if the processing unit detects two objects from the point cloud and the first object includes n features that match features found in the reference model and the second object includes n+1 features that match features found in the reference model, the processing unit can select the second object as the candidate target aircraft based on the number of features.

Once the robot 204 reaches within a threshold distance of the target aircraft 206, the robot 204 can perform one or more operations on the target aircraft 206 (e.g., fastener removal, contamination detection, painting).

Figure 3:
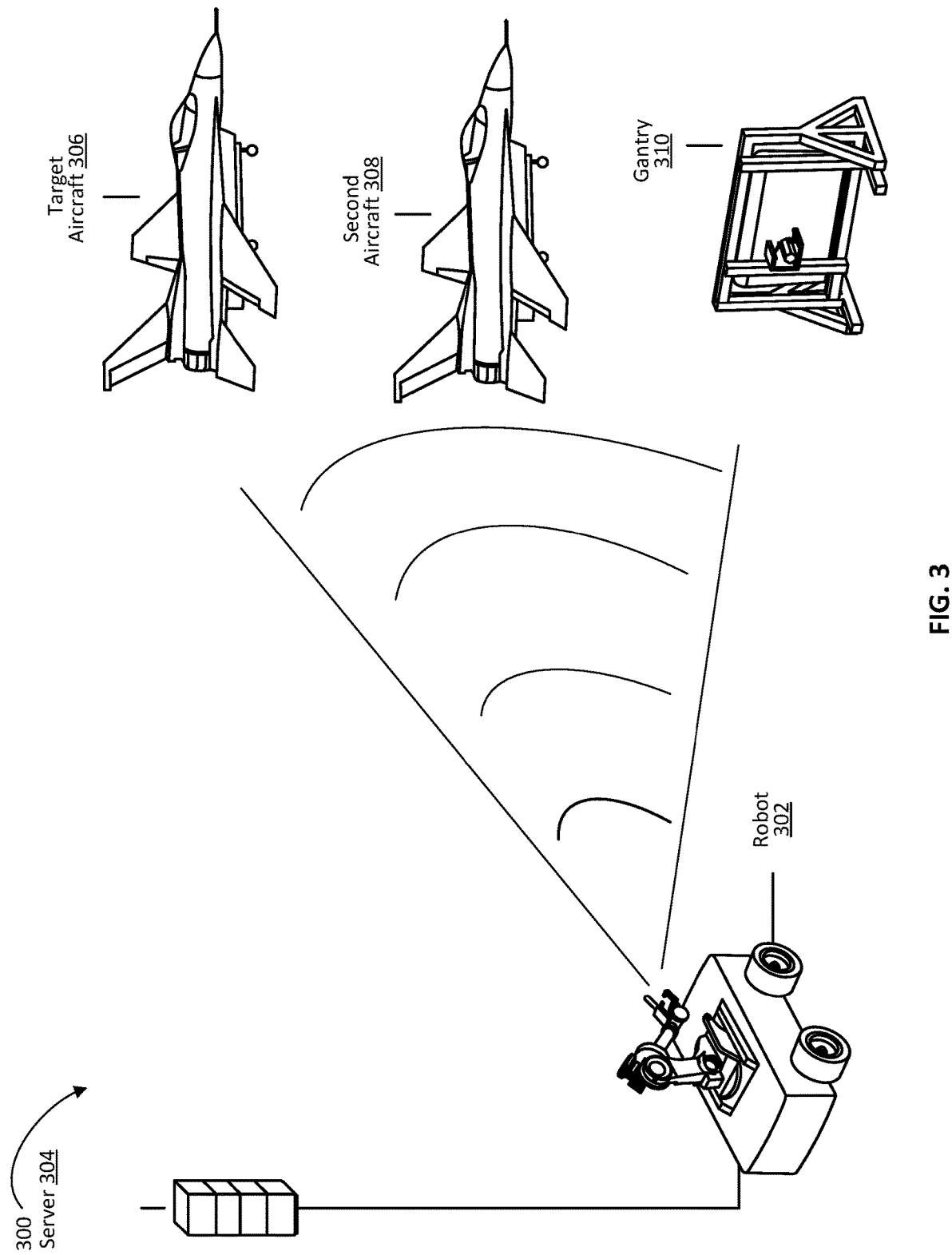
FIG. 3 is an illustration of auto-locating and movement relative to an aircraft, according to one or more embodiments.

FIG. 3 is an illustration of auto-locating and movement relative to an aircraft in an enclosure 300, according to one or more embodiments. FIG. 3 assists in illustrating differentiating between objects. As illustrated, the enclosure 300 includes a robot 302, a server 304, a target aircraft 306, a second aircraft 308, and a gantry 310. The robot 302 can be deployed to an enclosure 300 and initialized to perform some autonomous operation on a target aircraft. However, as indicated above, the robot 302 may not be pre-configured with a path to the target aircraft 306. Therefore, the robot 302 needs to be operable to distinguish the target aircraft 306 from the other objects in the enclosure 300, and to generate a path to the target aircraft 306 without any prior knowledge of the aircraft's position. In some instances, the target aircraft 306 and the second aircraft 308 are different model types (e.g., C-12J and C-12 Huron). In other instances, the target aircraft 306 and the second aircraft 308 are the same aircraft type (e.g., a first F-16 and a second F-16). Therefore, not only does not the robot 302 need to identify the target aircraft 306, but it must also be able to distinguish between two aircraft of the same type.

The robot 302 can be deployed to an enclosure 300 (e.g., hangar, runway, temporary depot) to perform an autonomous operation on a target aircraft. The robot 302 can obtain a multi-dimensional representation of the enclosure 300. The multi-dimensional enclosure 300 can be, for example, a point cloud. The robot 302 can either obtain a previously generated multi-dimensional representation or generate a multi-dimensional representation. For example, the robot 302 can obtain a previously generated multi-dimensional representation from a computing device, such as the server 304. The robot 302 can also create a multi-dimensional representation using one or more sensors. For example, the robot 302 can include a 3D vision sensor for transmitting signals and collecting signals reflected from the surfaces of objects in the enclosure 300. Based on the collected signals, the robot 302 can generate a multi-dimensional representation (e.g., point cloud) of the enclosure 300 including objects in the enclosure 300.

The robot 302 can further process the multi-dimensional representation to identify features that can be indicative of the target aircraft 306. The features can be multi-dimensional geometric features that are associated with the target aircraft 306. The robot 302 can employ a first neural network (e.g., CNN) that is trained to detect the multi-dimensional features from the representation. For example, the first neural network can be trained to use computer vision techniques for feature detection. The first neural network can be trained to extract primitive features, such as edges, corners, and texture. The first neural network can additionally be trained to extract compound features that include more than one primitive features. Each of the primitive features and compound features can be indicative of the target aircraft. The identified features can further include a six degrees of freedom position of each of the features. It should be appreciated that the identified features correspond to real-world objects in the enclosure 300.

In some embodiments, the first neural network can receive feature information that identifies the set of features based on the target aircraft type. For example, if an aircraft type includes a distinct geometric feature, the classifier can provide this information to the first neural network. In response, the first neural network, which can be a set of neural networks can employ various techniques to identify that geometric feature. In other instances, the first neural network can receive information that the target aircraft does not include a particular geometric feature. The first neural network can still extract the feature from the multi-dimensional representation, but the identified feature can be used to eliminate a candidate target aircraft as the target aircraft.

The robot 302 can further employ a second neural network to use to the identified features and identify the target aircraft 306. As illustrated, the robot 032 can identify three real-world objects that are candidate target aircraft, the target aircraft 306, the second aircraft 308, and the gantry 310. The first neural network can have identified features relating to each of the objects. The robot 302 can use a reference model along with the second neural network to identify the target aircraft 306 from the other objects. The reference model can include a virtual representation of the target aircraft. For example, the reference model can be a point cloud of the target aircraft. The second neural network can match the six degrees of freedom position of the identified features with the six degrees of freedom positions of features found in the reference model.

As indicated above, the enclosure 300 includes three candidate target aircraft: the target aircraft 306, the second aircraft 308, and the gantry 310. It can be seen from the illustration that the features of the gantry 310 do not match features of the target aircraft 306 or the second aircraft 308. Therefore, the second neural network can remove the gantry as a candidate target aircraft based on a comparison of the features identified by the first neural network and the reference model features. The second neural network can match the identified features with the reference model. Based on whether a threshold number of features match, the second neural network can identify an object as a candidate target aircraft.

The second neural network can further compare the reference model to features associated with the target aircraft 306 and the second aircraft 308. In some instances, a first candidate target aircraft (e.g., target aircraft 306) and the second candidate target aircraft (e.g., second aircraft 308) are different model types (e.g., P-3 Orion and T-6 Texan II). The second neural network can compare six degrees of freedom position of the features of the reference model with the six degrees of freedom position of the features associated with the first candidate target aircraft and with the second candidate target aircraft. The second neural network can detect that the six degrees of freedom position of the features associated with the second candidate target aircraft (e.g., second aircraft 308) do not match the six degrees of freedom position of the reference model features. The second neural network can further detect that the six degrees of freedom position of the features associated with the first candidate target aircraft (e.g., target aircraft 306) do match the six degrees of freedom position of the reference model features. Therefore, the second neural network can determine that the first candidate target aircraft is the target aircraft 306.

In other instances, the first candidate target aircraft (e.g., target aircraft 306) and the second candidate target aircraft (e.g., second aircraft 308) are the same or similar model types (e.g., both are F/A-18 Hornets). The second neural network can detect that the six degrees of freedom position of the features associated with the first candidate target aircraft and the second candidate target aircraft (e.g., second aircraft 308) match the six degrees of freedom position of the reference model features. However, the second neural network may be unable to distinguish the first candidate target aircraft from the second candidate target aircraft based on feature comparison alone.

In these instances, the robot 302 can select either the first candidate target aircraft or the second candidate target aircraft. The robot 302 can further continuously approach the selected candidate target aircraft and target sensors at this aircraft. The robot 302 can iteratively generate new multi-dimensional representations of the target aircraft, use a first neural network to identify features, and a second neural network to compare the identified features with the reference model features. In some instances, the comparisons can reveal differences between the features associated with the selected candidate target aircraft and the reference model features, such that the second neural network can disqualify the selected candidate target aircraft. In these instances, the robot can then target its sensors toward the other candidate target aircraft. The robot 302 can further continuously approach the other selected candidate target aircraft and target the sensors at the other candidate target aircraft. The robot 302 can iteratively generate new multi-dimensional representations of the target aircraft, use a first neural network to identify features, and a second neural network to compare the identified features with the reference model features.

In other instances, the comparisons do not reveal differences between the features associated with the selected candidate target aircraft and the reference model features, such that the second neural network cannot disqualify the selected candidate target aircraft. In these instances, the robot 302 can rely upon a third neural network training for image recognition. The robot 302 can approach the selected candidate target aircraft until it reaches a threshold distance. The robot 302 can determine that it has reached a threshold distance based on a combination of the odometry suite and the 3D vision sensor. Once the robot 302 reaches a threshold distance, the robot 302 can use an image-capturing device to scan the selected candidate target aircraft. The scanned images can be used to generate input data for the third neural network, which can be trained to detect an aircraft identifier, such as a tail number. The third neural network can further be trained to match the identified aircraft identifier to an aircraft identifier associated with the target aircraft. If the detected aircraft identifier matches the target aircraft identifier, the third neural network can determine that the candidate target aircraft is the target aircraft 306. If, however, the detected aircraft identifier does not match the candidate target aircraft identifier, the robot can approach the other candidate target aircraft. The robot 302 can approach the other candidate target aircraft until it reaches the threshold distance. Once the robot 302 reaches the threshold distance, the robot 302 can use the image-capturing device to scan the other candidate target aircraft. The scanned images can be used to generate input data for the third neural network, which can be trained to detect an aircraft identifier, such as a tail number. The third neural network can use the scanned images to determine whether the other candidate target aircraft is the target aircraft 306.

The process of distinguishing the target aircraft 306 from a set of a candidate target aircraft can be an iterative process, that the robot repeats as it approaches a candidate target aircraft. Once the target aircraft has been identified, a processing unit can execute a robot registration by calculating a transformation from a six degrees of freedom position of the robot to the target aircraft 306. A path for the robot to reach the target aircraft 206 based on the registration. In addition to the registration, the processing unit can use inverse kinematics to determine the robot's movements as it traverses the enclosure 300 to the target aircraft 306. The processing unit can determine the path and transmit control instructions to a base transport control to move the robot 302 toward the target aircraft 306. As the robot 302 is moving, the processing unit can collect data via an odometry suite to track the motion of the robot toward the target aircraft 306. In addition to collecting data from the odometry suite, a 3D vision sensor can be configured to continuously collect data to generate a new multi-dimensional representation.

In response to generating a multi-dimensional representation, the processing unit can reemploy the first neural network to extract features of the candidate target aircraft from the new multi-dimensional representation. The processing unit can then reemploy the second neural network to compare the reference model features to the features of the candidate target aircraft. In some instances, the processing unit can employ a third neural network that can use scanned images to detect an aircraft identifier, as described above. If, the processing unit determines that the candidate target aircraft is no longer viable candidate target aircraft, the processing unit can disqualify the candidate target aircraft as a viable candidate and rescan the enclosure 300 for a new candidate target aircraft.

If the processing unit determines that the candidate target aircraft is still a viable candidate target aircraft, the processing unit can calculate a new path to the candidate target aircraft from the robot's current position. The process can be iteratively repeated using the above-described steps until it reaches the target aircraft 306.

The processing unit can determine that the candidate target aircraft is the target aircraft 306 based on various methods. For example, in the instance that the processing unit verifies a threshold number of consecutive times that the candidate target aircraft is a viable candidate target aircraft based on a comparison with the reference model. In other instances, the processing unit determines that the candidate target aircraft is the target aircraft based on a number of features of each object from the point cloud that match the features for the reference model.

Figure 4:
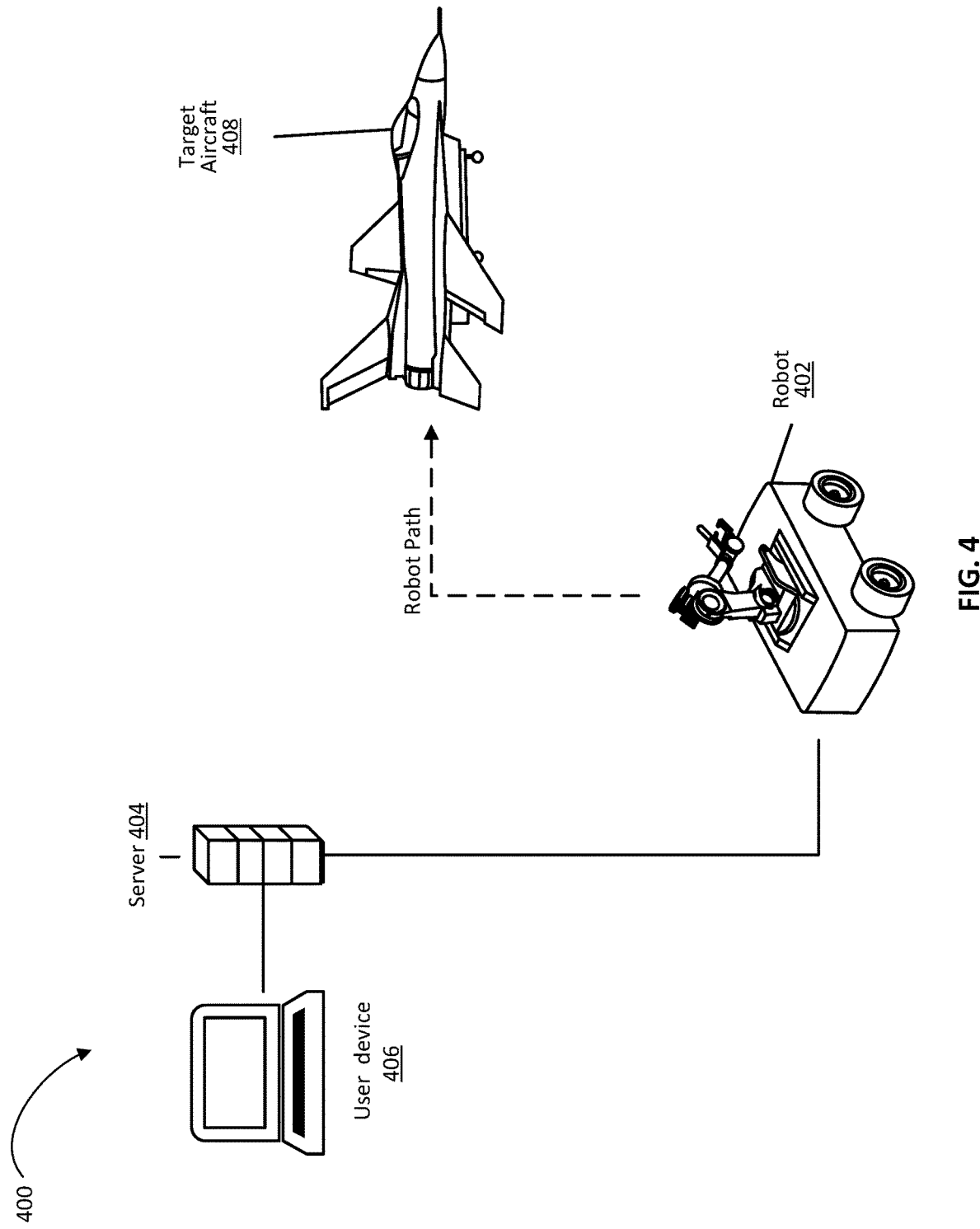
FIG. 4 is an illustration of auto-locating and positioning relative to an aircraft, in accordance with one or more embodiments.

FIG. 4 is an illustration 400 for auto-locating and positioning relative to an aircraft, in accordance with one or more embodiments. An enclosure can include a robot 402, a server 404 in operable communication with a user device 406 and a user device 406, and a target aircraft 408. The robot 402 can be in operable communication with the server 404 that, in turn, can be in operable communication with the user device 406. The server 404 can include one or more computing devices configured to support the robot 402. The server 404 be located at the same enclosure as the robot 402 or the server 404 can be located remotely from the robot 402.

A user can engage with the user device 406 to transmit messages to and from the server 404, which can, in turn, transmit and receive messages to and from the robot 402. For example, the messages can include instructions for the robot 402 to perform some autonomous operation on the target aircraft 408. The robot 402, the server 404, and the user device 406 can be configured to permit the robot to perform autonomous operations on an aircraft 408 and or parts thereof or another real-world object. The autonomous operations can include, for example, removing, replacing or installing fasteners for the aircraft 408, decontamination of the aircraft 408, and painting the aircraft 408. It should be appreciated that as illustrated, the user device 406 can communicate with the robot 402 via the server 404. In other embodiments, the user device 406 can communicate directly with the robot 402, and further the user device 406 performs the below described functionality of the server 404.

In addition, the user can use the user device 406 to provide instructions to the robot 402, a user can use the user device 406 to transmit control instructions to perform an autonomous operation on the target aircraft. The user device 406 can include a user interface (UI) for providing virtual representations and scanned images of the enclosure, including the target aircraft 408.

Even without prior data describing a location of the target aircraft 408, the robot 402 can navigate to the operational area and, once thereat, perform a set of operations to register the aircraft 410 (or a part thereof) to then perform another set of operations on the aircraft 410 (and/or the airplane part). Some of these operations can be computationally expensive (e.g., a feature extraction phase, registration phase, path and trajectory generation phase), whereas other operations can be less computationally expensive and more latency sensitive (e.g., drilling a fastener hole operation). The computationally expensive operation(s) can be offloaded to the server 404, whereas the remaining operation(s) can be performed locally by the robot 402.

For example, the robot 402 or the server 404 can receive a multi-dimensional representation (e.g., a point cloud generated from 3D vision sensor) to distinguish the target aircraft 408 from any other object in the enclosure. The robot 402 can further use odometry information to calculate a path to traverse the enclosure to reach the target aircraft 408. For example, the robot 402 or the server 404 can calculate a transformation to translate the coordinate system of the target aircraft 408 to the coordinate system of the robot 402. Additionally, the robot 402 or the server 404 can calculate, using inverse kinematics, a trajectory (e.g., robot movements) for the robot 402 to follow to reach the target aircraft 408. The trajectory can take into account other objects in the enclosure (e.g., a second aircraft, a mobile gantry) and include movements to avoid these obstacles. Once the robot's operations are completed, the robot 402 can autonomously return to a parking area or can be summoned to another operational area.

In an example, a robot 402 can include a movable base, a power system, a powertrain system, a navigation system, a sensor system, a robotic arm, an end effector, input and output (I/O) interfaces, and a computer system. The end-effector can support a particular autonomous operation (e.g., drilling) can be a line-replaceable unit with a standard interface, such that the end-effector can be replaced with another one that supports a different autonomous operation (e.g., sealing). The end-effector replacement can be carried by the robot 402 itself or can use a manual process, where an operator can perform the replacement. The I/O interfaces can include a communication interface to communicate with the server 404, and the user device 406, for the selection of autonomous operations to be performed by the robot 802. The computer system can include one or more processors and one or more memory storing instructions that, upon execution by the one or more processors, configure the robot 802 to perform different operations. The instructions can correspond to program codes for the navigation, controls of the power system, controls of the powertrain system, the collection and processing of sensor data, the controls of the robotic arm, the controls of the end effectors, and/or the communications.

The robot 402 can include a 3D vision sensor to emit a signal toward the aircraft 410. The 3D vision sensor can further be configured to collect signals reflected off of the aircraft 410. The 3D vision sensor can determine an angle of reflection of the reflected signal and a time elapse (time-of-flight) between transmitting the signal and receiving a reflected signal to determine a position of a reflection point on the surface of the aircraft 810 relative to the 3D vision sensor. The robot 402 can continuously emit signals and collect reflection signals. The robot 402 can transmit the sensor data to the server 404, which can further generate a point cloud of the aircraft 410. The server 404 can further populate a data structure using values derived from the point cloud. The server 404 can retrieve a stored reference model of the target aircraft 408.

The server 404 can be a hardware computer system that includes one or more I/O interfaces to communicate with the robot 402 and the user device 406. The server 404 can further include one or more processors, and one or more memory storing instructions that, upon execution by the one or more processors, configure the server 404 to perform different operations. The instructions can correspond to program codes for the communications and for processes to be executed locally on server 404 for the robot 402 given data sent by the robot 402. The server 404 can further be configured to store a digital thread that holds values (e.g., fastener positions, contamination locations) associated with the target aircraft 408, and over the lifecycle of the aircraft 408. The robot 402 can use one or more of these values to perform one or more operations on the target aircraft 408.

The user device 406 can be a hardware computer system that includes one or more I/O interfaces to communicate with the server 404 and with the robot 402. The user device can further include one or more input interfaces (e.g., a mouse, a keyboard, a touch screen) for receiving user inputs.

In response to one or more inputs, multiple operations may be needed to be performed and inter-dependencies between these operations may exist. For instance, to identify fasteners and/or drill fastener holes on the target aircraft 408, the robot 402 can detect candidate target aircraft, identify the target aircraft 408, register the target aircraft 408 so that it can be located in a local coordinate system of the robot 402, control the robotic arm to move, according to a particular trajectory, and control the end effector to drill. Some of the operations can be computationally expensive and performed less frequently (e.g., generating a simultaneous localization and mapping (SLAM) map, registration), whereas other operations can be computationally less expensive but latency sensitive and performed more frequently (e.g., controlling the robotic arm and end effector). As such, the server 404 can execute processes for the computationally expensive/less frequently performed operations, whereas the robot 402 can locally execute processes for the remaining operations.

In some instances, a user can select one or more inputs for controlling the robot 402. The user device 406 can receive the inputs and transmit a message including the inputs to the server 404. The server 404 can include an application for performing one or more operations to control the robot 402. The server 404 can receive and transmit messages to and from the robot 402. For the local operations, the robot 402 can execute the corresponding processes locally and can inform the server 404 of the results of these local operations (e.g., that a fastener hole was drilled at a particular section of the aircraft 410).

Figure 5:
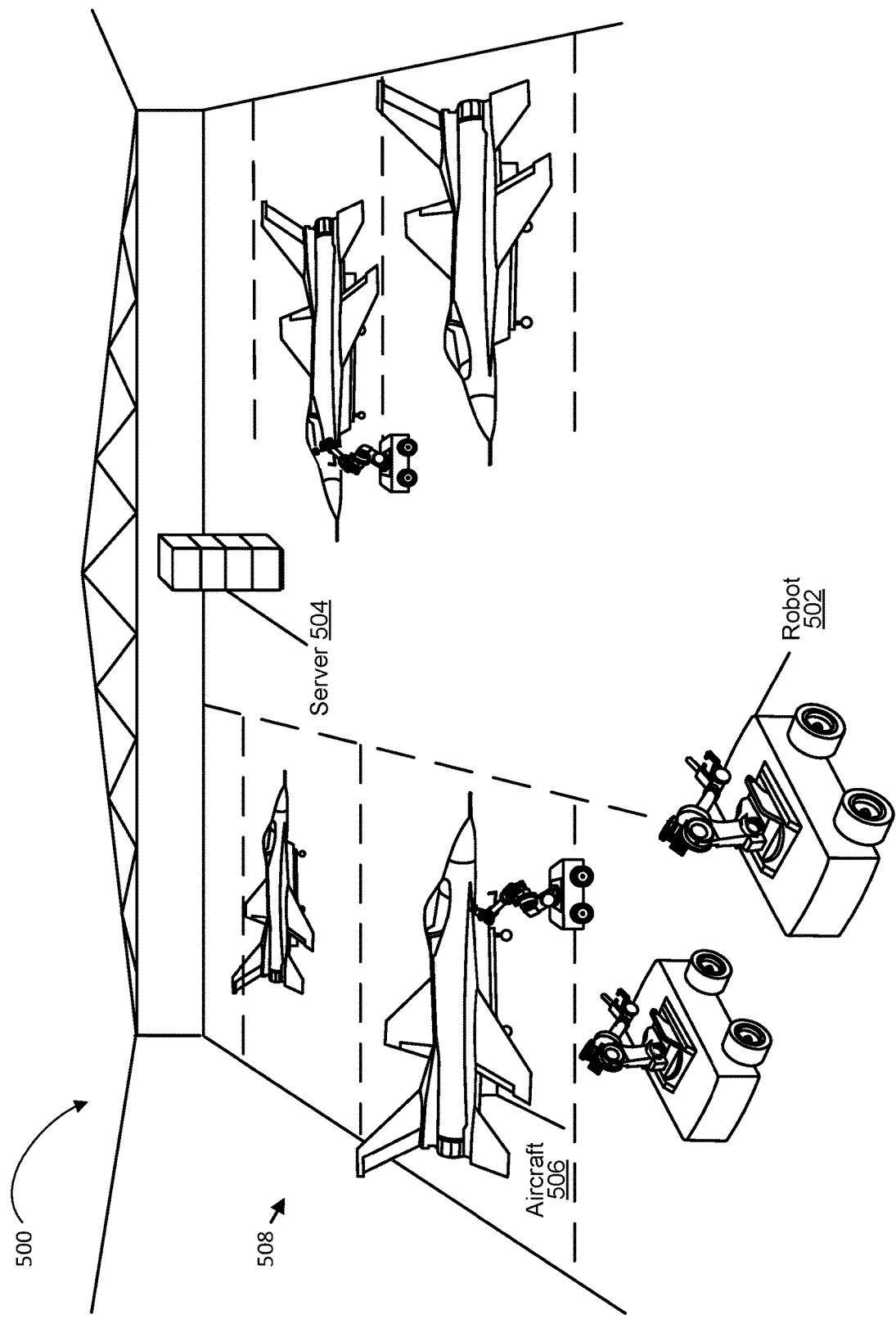
FIG. 5 is an illustration of a network environment for robotic operations, according to one or more embodiments.

FIG. 5 is an illustration 500 of a network environment for robotic operations, according to one or more embodiments. The example network environment includes a plurality of robots 502 and a server 504. The robots 502 can be communicatively coupled with the server 504 that, in turn, is communicatively coupled with one or more other computing systems. The server 504 can be an on-premises server or an off-site server. The server 504 can be deployed to support the robots 502, and the robots 502 can be capable of autonomous operations on different aircraft 506. As illustrated, the premises can represent an enclosure 508 that includes the aircraft 506. Autonomous operations by the robots 502 can be performed on such aircraft 506 and/or parts thereof (e.g., on wings, fuselage sections, etc.).

For example, the enclosure 508 can be a warehouse, a storage facility, a manufacturing facility, or any other building with controlled access thereto and housing the aircraft 506. The aircraft 506 can be distributed at predefined areas (e.g., bays) within the enclosure 508 or can be scattered without a particular pre-defined arrangement or predefined areas.

The enclosure 508 can also include a parking area for storing or queuing the robots 502 when not performing operations. A robot 502 can be summoned from the parking area to an operational area that contains an aircraft 506. The robot 502 can autonomously navigate to the operational area and, once thereat, perform a set of operations to register the aircraft 506 (or a part thereof as described herein) to then perform another set of operations on the aircraft 506 (and/or the airplane part The server 504 can be a hardware computer system that includes one or more I/O interfaces to communicate with the robots 502, one or more processors, and one or more memory storing instructions that, upon execution by the one or more processors, configure the server 504 to perform different operations. The instructions can correspond to program codes for the communications and for processes to be executed locally on the server 504 for a robot 502 given data sent by the robot 502.

For example, wireless communications (e.g., through a wireless network) can be established between the robots 502 and the server 504. The wireless communications can be protected (e.g., by using encryption).

The server 504 can maintain status data indicating the operational status and capability data indicating the operational capabilities of each robot 502. The operational status of a robot 502 can be available (e.g., the robot 502 can be deployed), busy (e.g., the robot 502 is already deployed), or unavailable (e.g., the robot 502 is down for maintenance). The server 504 can also maintain data indicating locations of the aircraft 506. The operational capabilities can indicate the autonomous operations that the robot 502 can support (e.g., drilling, sealing, cleaning, etc.). Given the operational instructions, the status data, and the capability data, the server 504 can select a robot 502 (e.g., one that is available and capable to support the operational instructions) and instruct the robot 502 to move to the area that contains the aircraft as described herein.

The server can further store a database that can store data collected by the robot 502 during the autonomous operations. As each robot 502 interacts with the aircraft 506 in the enclosure during the autonomous operations, information related to robot and aircraft elements can be collected during the performance of the operations. Each robot 502 can be deployed within the enclosure 508, and each robot 502 can use various sensors during the autonomous operations. In some instances, each of the robots can use the same sensor type. For example, two robots can each use a respective light-emitting sensor to gather point cloud information of the enclosure 508 and the aircraft 506 stored therein. However, as each of the robots 502 started from a different starting position and may be deployed to different aircraft 506, each robot 502 can gather point cloud information from different perspectives. In another example, each robot 502 collects information from different sensor types. For instance, one robot 502 collects infrared information from a sensor, and another robot 502 collects acoustic information from a sensor. In yet another example, one robot 502 uses different sensors during an autonomous operation.

The sensor information from each robot 502 can be stored in the database. The information can be accessed by multiple computing systems. Each computing system can analyze the information and use the analysis to support decisions related to the determination of an aircraft condition and the autonomous operation to perform. As each robot 502 performs a subsequent job, information can again be collected and the database can be updated. This cycle can be repeated throughout the lifecycle of the aircraft to enable autonomous operations to be performed on the aircraft 506 and optimize the performance of the robot 502.

Figure 6:
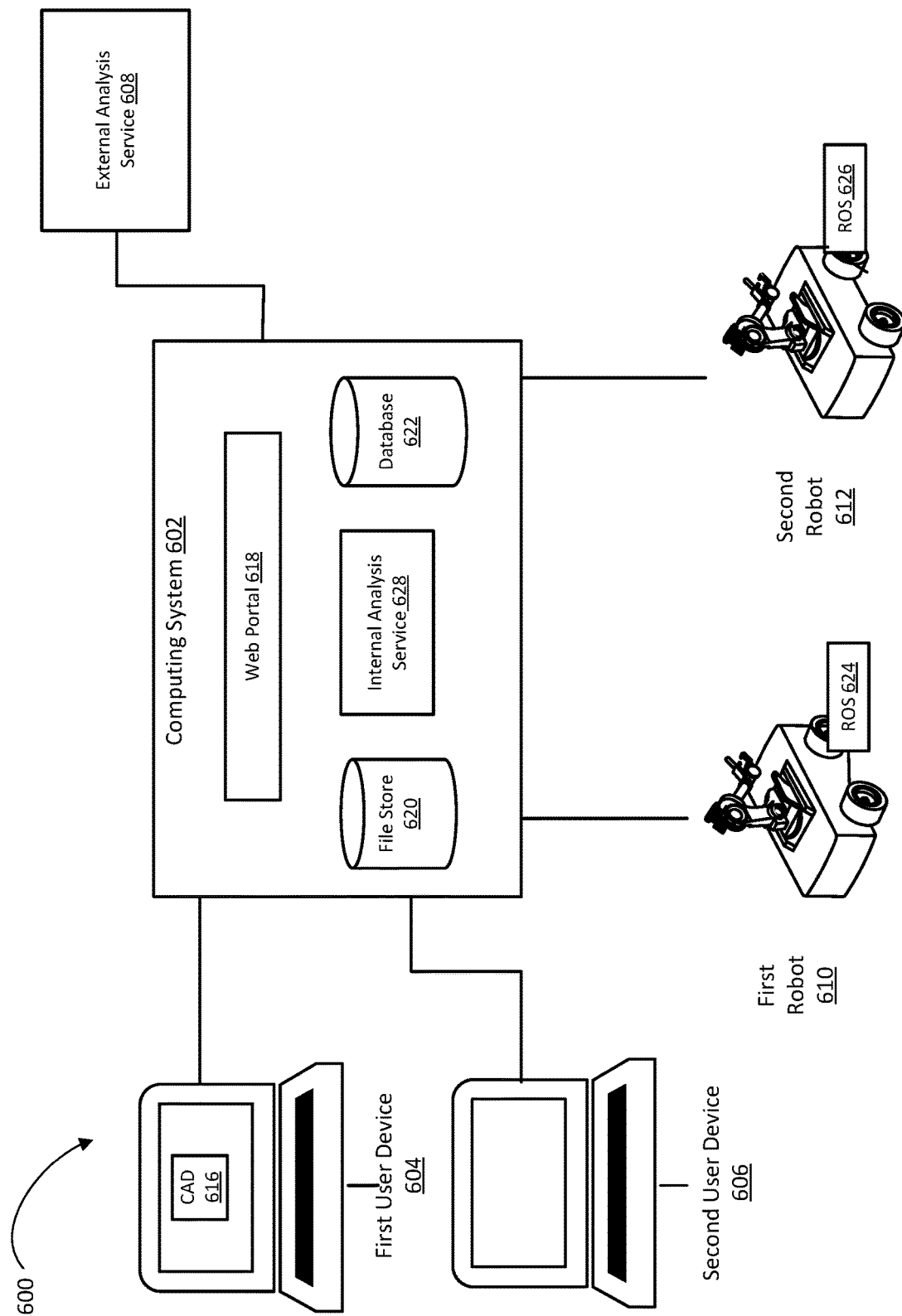
FIG. 6 is an illustration of a data gathering and analysis network, according to one or more embodiments.

FIG. 6 is an illustration 600 of a data gathering and analysis network, according to one or more embodiments. A computing system 602 can be in operable communication with one or more computing devices. As illustrated, the computing system 602 can be in communication with a first user device 604, a second user device 606, and an external analysis service 608, a first robot 610, and a second robot 612. It should be appreciated that the computing system 602 is not necessarily in communication with each of the first user device 604, a second user device 606, and an external analysis service 608, a first robot 610, and a second robot 612 at the same time.

The first user device 604 can include design software, such as computer-aided design (CAD) software 616, for generating a two-dimensional or three-dimensional representation of an object, such as an aircraft, gantry, or equipment. The first user device 604 can receive scan data of an object or a part of an object. The scan data can be sensor-based data collected by a robot performing an autonomous operation, or the scan data can be sensor-based data collected irrespective of a robot's autonomous operation. For example, the first user device can receive a scan of an entire aircraft or a fuselage of the aircraft collected by the first robot 610 during a robot's autonomous operation. The design software can be used to generate a two-dimensional or three-dimensional representation of the object. For example, the design software can be used to generate a point cloud of an aircraft or an aircraft part based on the scan data.

The first user device 604 can further access the computing system 602 via a web portal 618, which provides a point of access or gateway to the computing system 602. The first user device 604 can further transmit a file containing the two-dimensional or three-dimensional representation and any associated metadata (e.g., identification of the object, description of the autonomous operation performed, tool(s) used to perform the autonomous operation, the robot used to perform the autonomous operation, description of parts operated upon).

The computing system can store the two-dimensional or three-dimensional representation in a file store 620, which can include a hierarchical storage for files (e.g., .ply files). The computing system 602 can further store the metadata in a database 622. In addition to receiving data from the first computing device 602, the first robot 610 and the second robot 612 can use their respective robot operating system (ROS) 624, 626 to access the file store 620 to store sensor data (e.g., data collected from an image-capturing device, data collected from a LIDAR sensor, data collected from an infrared sensor) in the file store 620. The first robot 610 and the second robot 612 can further use their respective ROS 624, 626 to store metadata in the database 622.

The following is a description example of aircraft related information stored in the database 622. One of ordinary skill in the art can contemplate a similar structure for storing metadata related to different objects, such as a rotary wing aircraft or a gantry. The database 622 can include metadata organized in a hierarchical tree structure describing an aircraft from a description of the aircraft (e.g., aircraft identifier) down to a description of an individual part (e.g., a fastener identifier, a rotor identifier, plate identifier, or another part that may be worked upon).

For example, the database 622 can include a root table, such as an aircraft table. The aircraft table can include metadata, such as an aircraft identifier, each particular robot that has performed an autonomous operation on the aircraft, each particular tool that has been used to perform an autonomous operation on the aircraft, and a description of each autonomous operation performed on the aircraft. The aircraft table can further include information that can be used to access sensor data (e.g., infrared data, point cloud data, eddy current data, image data) of the aircraft from the file store 620. For example, the aircraft table can include the memory address of the aircraft data stored at the file store 620.

The database 622 can further include section tables for each section of the aircraft. Each section table can be considered a leaf table of the aircraft table, which can be considered a root table. Each section table can describe the aircraft at a higher level of granularity than the aircraft table. For example, one section table can include a left wing table that includes metadata related to a wing of the aircraft, and another section table can include a right wing. The database can include, for example, a left wing table and a right wing table connected to the aircraft table. Furthermore, each of the left wing table and the right wing table can be connected to multiple panel tables that include metadata describing the individual panels that form the left wing and the right wing.

Each panel table can be connected to a fastener table that include metadata describing each individual fastener. The fastener table can include metadata, such as a path scanning order, which can be an order by which a robot tool scans the fasteners installed in on the panel. The fastener table can further include a path order tool identifier, which can identify the tool used to scan the surface of the section. The fastener table can further include a present field, which can describe whether the fastener was either present or not present in the section. The fastener table can further include a type field describing the type of fastener. The fastener table can further include a status field, and the status field can include a character string describing a status of the fastener (e.g., to remain, to be replaced, structurally intact, damaged). The fastener table can include additional metadata. It can be seen the detailed level of granularity that can be provided by the fastener table.

The metadata stored in the database 622 can be obtained during any autonomous operation performed on the aircraft. For example, during the lifecycle of the aircraft, multiple autonomous operations can be performed on the aircraft or a nearby aircraft or object. Each time that a robot (e.g., the first robot 610 or the second robot 612) is deployed to perform an autonomous operation, the robot can collect sensor data and transmit the sensor data to the file store 620 and the database 622. Each time that the first robot 610 and the second robot 612 perform an autonomous operation on the aircraft, each of the first robot 610 and the second robot 612 can transmit the data to the database. In some instances, the data may already be present in the database 622, and the computing system does not need to update the database 622. For example, an aircraft identifier detected by a robot is likely to be the same aircraft identifier stored in the aircraft table. However, each time a robot (e.g., the first robot 610 or the second robot 612) performs an autonomous operation on the aircraft, the aircraft table can be updated to indicate the autonomous operation, including a time, date, robot identifier, and a description (e.g., a memory address in the file store 620) of sensor data collected during the autonomous operation.

The information in the file store 620 and the database 622 can be used to generate instructions for performing the autonomous operations. For example, the second user device 606 can include ROS software to generate control instructions to direct the first robot 610 and/or the second robot 612 to perform an autonomous operation. The second user device 606 can further access information from the file store 620 and the database 622. For example, the second user device 606 can access metadata describing the status of different components of the aircraft from the database. For example, the status can include an indication of whether a fastener is broken or missing and needs to be replaced. The second user device 606 can access sensor data from the file store 620 to confirm the metadata. The second user device 606 can further access the location metadata of a target aircraft and any surrounding objects (e.g., other aircraft) to generate a path for the robot to travel to the target aircraft. The second user device 606 can further access the location metadata of a target component of aircraft (e.g., a fastener) to generate a trajectory for the robot tool to access the component.

It should be appreciated that one of ordinary skill in the art can contemplate other hierarchical tables for an aircraft or other structure, such as a gantry. In other words, each table of the hierarchical data structure can be connected to another table that includes metadata describing an aspect of the object at a higher level of granularity, and the tables are not necessarily an aircraft table, a panel table, and a fastener table.

The file store 620 and the database 622 can be accessed and analyzed to improve the autonomous operation performance of the robots. For example, the external analysis service 608 can be configured to use an application programming interface (API) to access data and metadata from the file store 620 and the database 622. The external analysis service 608 can include one or more machine learning models that are trained to analyze the data retrieved from the file store 620 and the database 622. For example, the external analysis service 608 can include a machine learning model trained to receive data collected from a sensor as an input and perform one or more tasks. The tasks can include generating information to be used to effectuate an autonomous operation. For example, a machine learning task can be to predict a location and nature of a defect on an aircraft including missing or broken parts. Another task can include generating a two-dimensional and three-dimensional model of an object, such as an aircraft. Another task can further include classifying new features that can be used to identify an aircraft from point cloud data. The external analysis service 608 can, in turn, return the task outputs to file store 620 and the database 622. The task outputs can be used, for example to update the data and metadata stored in the file store 620 and the database 622. For example, the external analysis service 608 can access a fastener table from the database 622 and access electrical parameters derived from an eddy current analysis of the fastener. The external analysis service 608 can use a machine learning model to predict a fault at a fastener based on the electrical parameters, and the prediction can be stored at the fastener table. If the stored fastener status in the database already indicates that there is a fault, then the metadata can be further updated to indicate that the machine learning model analysis also indicates that there is a fault. If, however, the stored fastener status in the database indicates that there is no fault at the fastener, the fastener table can be updated to indicate that the machine learning model indicates that there is a fault at the fastener. This information can further be used to schedule an autonomous operation by a robot on the fastener.

In some instances, the computing system 602 can include a notification service that can notify the external analysis service 608 each time that either the file store 620 or the database 622 has been updated. The notification service can be in communication with the file store 620 and the database 622 and be configured to detect each time that the information in either the file store 620 or the database 622 is updated (e.g., a new point cloud file is saved to the file store 620 or a table is updated in the database 622). The external analysis service 608, upon receipt of the notification, can access the file store 620 and the database 622. The external analysis service 608 can further use the one or more machine learning models to analyze the information received from the file store 620 and the database 622. The external analysis service 608 can again transmit any task outputs to the file store 620 and the database 622. In this sense, the external analysis service 608 can initiate an analysis of updated information without a manual input from a user. Rather the notification service's message indicating that either the file store 620 or the database 622 has been updated can prompt the external analysis service 608 to automatically initiate an analysis of the updated information.

In some instances, the computing system 602 can include an internal analysis service 628. The internal analysis service 628 can also include one or more machine learning models. A user can use a computing device, such as the first user device 604 or the second user device 606, and access the internal analysis service 628. The user can identify, for example, an object to be analyzed, such as an aircraft, an aircraft section or sections, or a part (e.g., a fastener or set of fasteners). Based on the identified object(s), the internal analysis service 628 can access information from both the file store 620 and the database 622. The user can further identify an analysis type or machine learning model to perform the analysis. For example, one user can select an analysis of eddy current data for each fastener on the aircraft panel. In another instance, a user may select a comparative analysis of information about an aircraft, information about a section of the aircraft, and information about a part of the section to identify new features that can be used to identify a part, a section, or an aircraft. The internal analysis service 628 can perform the analysis and transmit the task outputs to the computing service (e.g., first user device 604 or second user device 606). Similar to the external analysis service 608, the internal analysis service 628 can further transmit the task outputs to the file store 620 and the database 622.

Figure 7:
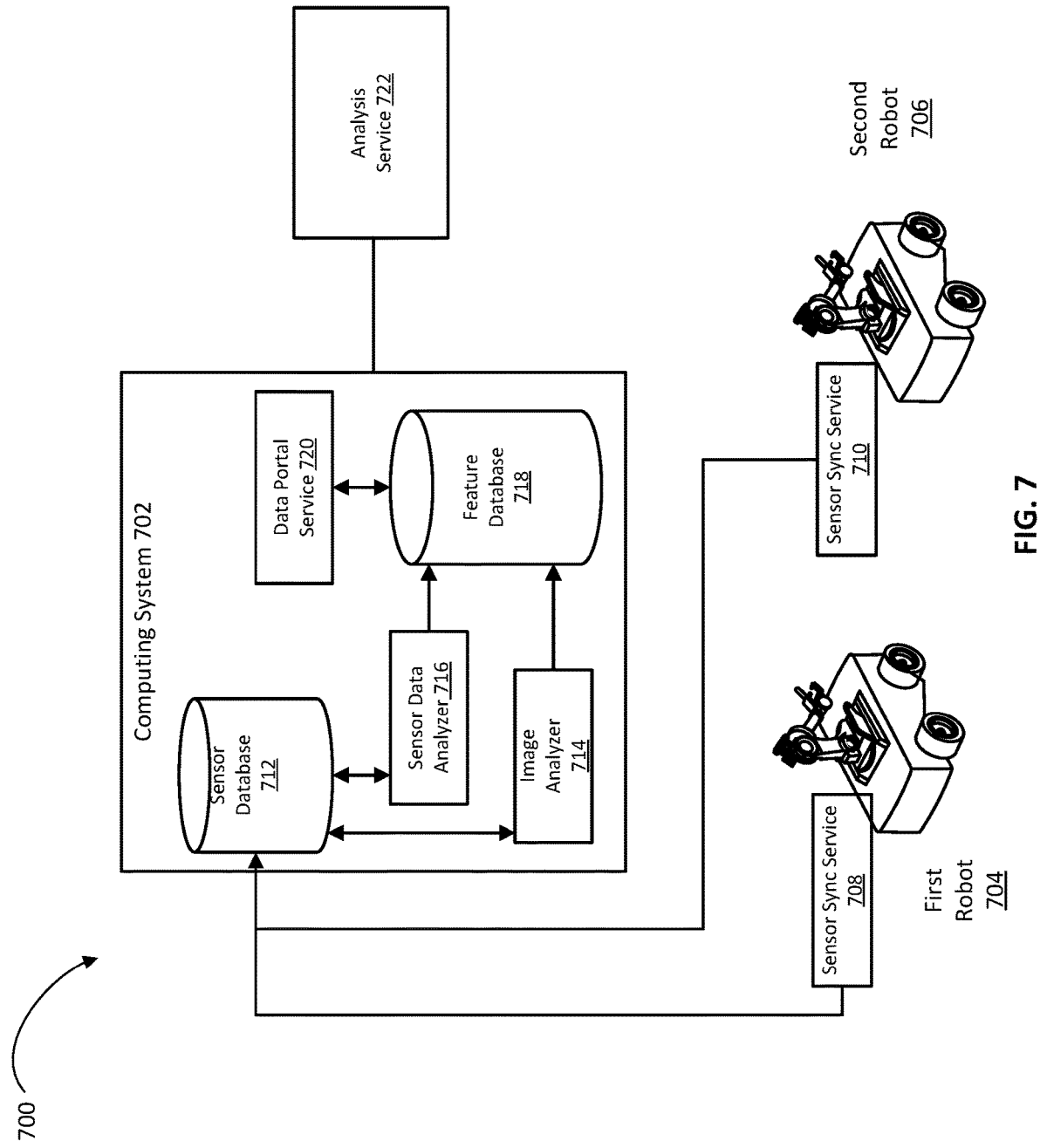
FIG. 7 is an illustration of a data gathering and analysis network, according to one or more embodiments.

FIG. 7 is an illustration 700 of a data gathering and analysis network, according to one or more embodiments. As indicated above, a robot can use features from a point cloud to identify a target aircraft. Additionally, one or more features can be used to identify a fault in the aircraft. Furthermore, continuous refinement of features associated with a particular aircraft can assist a robot with more precise path generation, tool trajectory, and autonomous operation performance. A computing system 702 (e.g., the computing system 602) can be in operable communication with an analysis service 702 a first robot 704 and a second robot 706. It should be appreciated that the computing system 702 is not necessarily in communication with each of the analysis service 722 (e.g., the external analysis service 608), the first robot 704, and the second robot 706 at the same time.

The first robot 704 and the second robot 706 can collect data using one or more sensors while performing an autonomous operation. For example, each of the first robot 704 and the second robot 706 can include a sensor synchronization service 708, 710 that is configured to access data collected by each robot sensor and transmit the data to a sensor database 712. The sensor database can include the database 622 or be a separate database of the computing system 702. For example, the first robot 704 can perform an autonomous operation on a particular aircraft and collect sensor based data. The sensor synchronization service 708 can determine the identity of the aircraft and associate the sensor data with the aircraft.

An image analyzer 714 and a sensor data analyzer 716 can be configured to monitor the sensor database 712 for any sensor information. The image analyzer 714 can access image data stored on the sensor database 712, including data collected by an image-capturing device (e.g., a video camera mounted on the first robot 704 or the second robot 706). The sensor data analyzer 716 can access non-image data, such as acoustic data, electrical parameter data, infrared data, and LIDAR data. Each of the image analyzer 714 and the sensor data analyzer 716 can analyze the sensor data to determine if there are new features that can be used to assist in the performance of autonomous operations. In the event that either the image analyzer 714 or the sensor data analyzer 716 determines a new feature, the new feature can be stored in a feature database 718.

The analysis service 722 can be configured to use an API to access data from the feature database via the data portal service 720. The analysis service 722 can include one or more machine learning models that are trained to analyze the data retrieved from the feature database 718. For example, the analysis service 722 can include a machine learning model trained to receive feature data as an input and perform one or more tasks. The tasks can be directed toward identifying features for improving a robot's performance for an autonomous operation. In the event that the analysis service 722 does detect a new feature, the analysis service 722 can transmit the identification of the new features to the computing system 702. The computing system can store the new features in the feature database 718.

Figure 8:
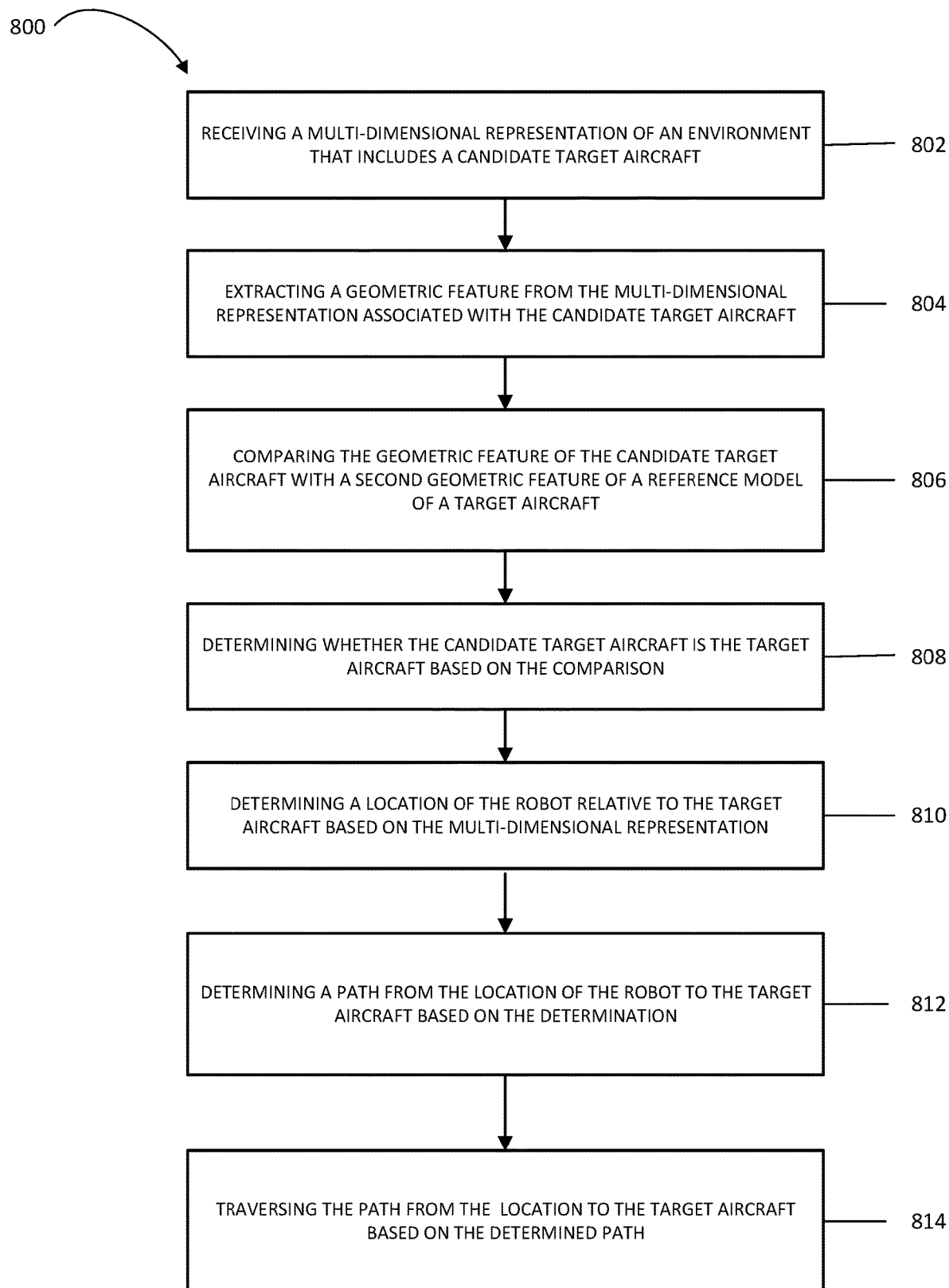
FIG. 8 is a process flow for auto-locating and positioning relative to an aircraft, according to one or more embodiments.

FIG. 8 is a process flow 800 for auto-locating and positioning relative to an aircraft, according to one or more embodiments. At 802, the method can include a robot receiving a multi-dimensional representation of an enclosure that includes a candidate target aircraft. The multi-dimensional representation can be, for example, a point cloud generated from 3D vision sensor data. The multi-dimensional representation can be received from an external source, such as a server. Alternatively, the multi-dimensional representation can be generated using a 3D vision sensor unit coupled to the robot.

At 804, the method can include the robot extracting a feature (e.g., geometric feature) from the multi-dimensional representation associated with the candidate target aircraft. The robot can employ a neural network (e.g., a CNN) that is trained to detect features from the multi-dimensional representation. The features can be associated with features found on an aircraft. In some embodiments, the robot can receive a set of features associated with a target aircraft, and the neural network can be configured to search for those features.

At 806, the method can include the robot comparing the feature of the candidate target aircraft with a second feature from a reference model of a target aircraft. The robot can employ a second neural network that is trained to compare the features extracted by the neural network and compare those features with features found in a reference model of the target aircraft.

At 808, the method can include the robot determining whether the candidate target aircraft is the target aircraft based on the comparison. The second neural network can generate a second output, which can include a prediction as to whether the candidate target object is the target object.

At 810, the method can include the robot determining a location of the robot relative to the target aircraft based on the multi-dimensional representation.

At 812, the method can include the robot determining a path from a location of the robot to the target aircraft based on the determination. The robot can perform registration by calculating a transformation from a reference frame of the robot to a working frame for the target aircraft. Based on the calculation, the robot can calculate a path for the robot to traverse the surface of the enclosure to reach the target aircraft. The robot can further use inverse kinematics to calculate a set of movements for the robot (e.g., robotic arm) for the robot to follow to reach the target object without collision.

At 814, the method can include the robot traversing the path from the location to the target aircraft based on the determined path. As described above, the process is iterative, and therefore the robot can determine a new path for each stage from an initial location to the target aircraft.

Figure 9:
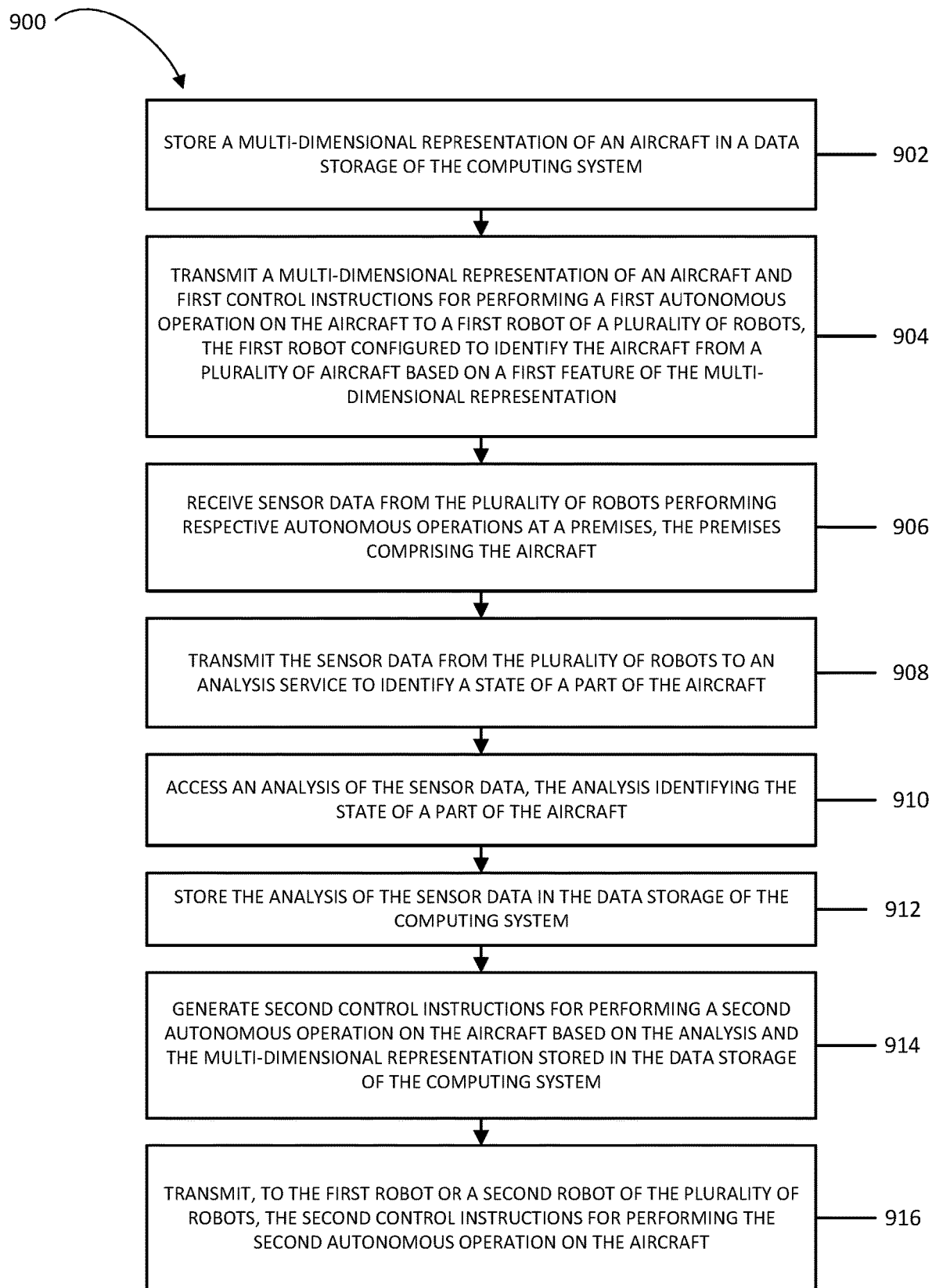
FIG. 9 is a process flow for generating control instructions for a robot, according to one or more embodiments.

FIG. 9 is a process flow 900 for generating control instructions for a robot, according to one or more embodiments. At 902, a computing system (e.g., computing system 602) can store a multi-dimensional representation of an aircraft in a data storage of the computing system. The data storage of the computing system can include a file store (e.g., file store 620) and a database (e.g., database 622). The sensor data from the plurality of robots can be stored in the file store of the computing system. The associated metadata can be stored in the database of the computing system. The sensor data can include, for example, image data of the part of the aircraft and electrical parameters part of the aircraft.

At 904, the computing system can transmit a multi-dimensional representation of an aircraft and first control instructions for performing a first autonomous operation on the aircraft to a first robot of a plurality of robots, the first robot configured to identify the aircraft from a plurality of aircraft based on a first feature of the multi-dimensional representation.

At 906, the computing system can receive sensor data from the plurality of robots performing respective autonomous operations at a premises, the premises can include the aircraft.

At 908, the computing system can transmit the sensor data from the plurality of robots to an analysis service to identify a state of a part of the aircraft.

At 910, the computing system can access an analysis of the sensor data, the analysis identifying the state of a part of the aircraft. The analysis service can be an external analysis service (e.g., the external analysis service 608). The sensor data can be transmitted to the external analysis service by the computing system using an application programming interface (API).

At 912, the computing system can store the analysis of the sensor data in the data storage of the computing system. The computing system can update the associated metadata in the database to indicate the analysis of the part of the aircraft, including the state of the part.

At 914, the computing system can generate second control instructions for performing a second autonomous operation on the aircraft based on the analysis and the multidimensional representation stored in the data storage of the computing system. The part can be, for example, a fastener, and wherein the second control instructions comprise repairing the fastener.

At 916, the computing system can transmit to the first robot or a second root of the plurality of robots, the second control instructions for performing the second autonomous operation on the aircraft. The computing system can determine an identification of the part based at least in part on the second control instructions. The computing system can further identify an associated metadata instance of the part based on the determined identification of the part. The computing system can further access a point cloud of the aircraft based on the determined identification of the part. The computing system can further determine a path for a robot to travel to the aircraft based on the accessed point cloud. As there is a plurality of robots, the path can be based on a starting position for a particular robot.

Figure 10:
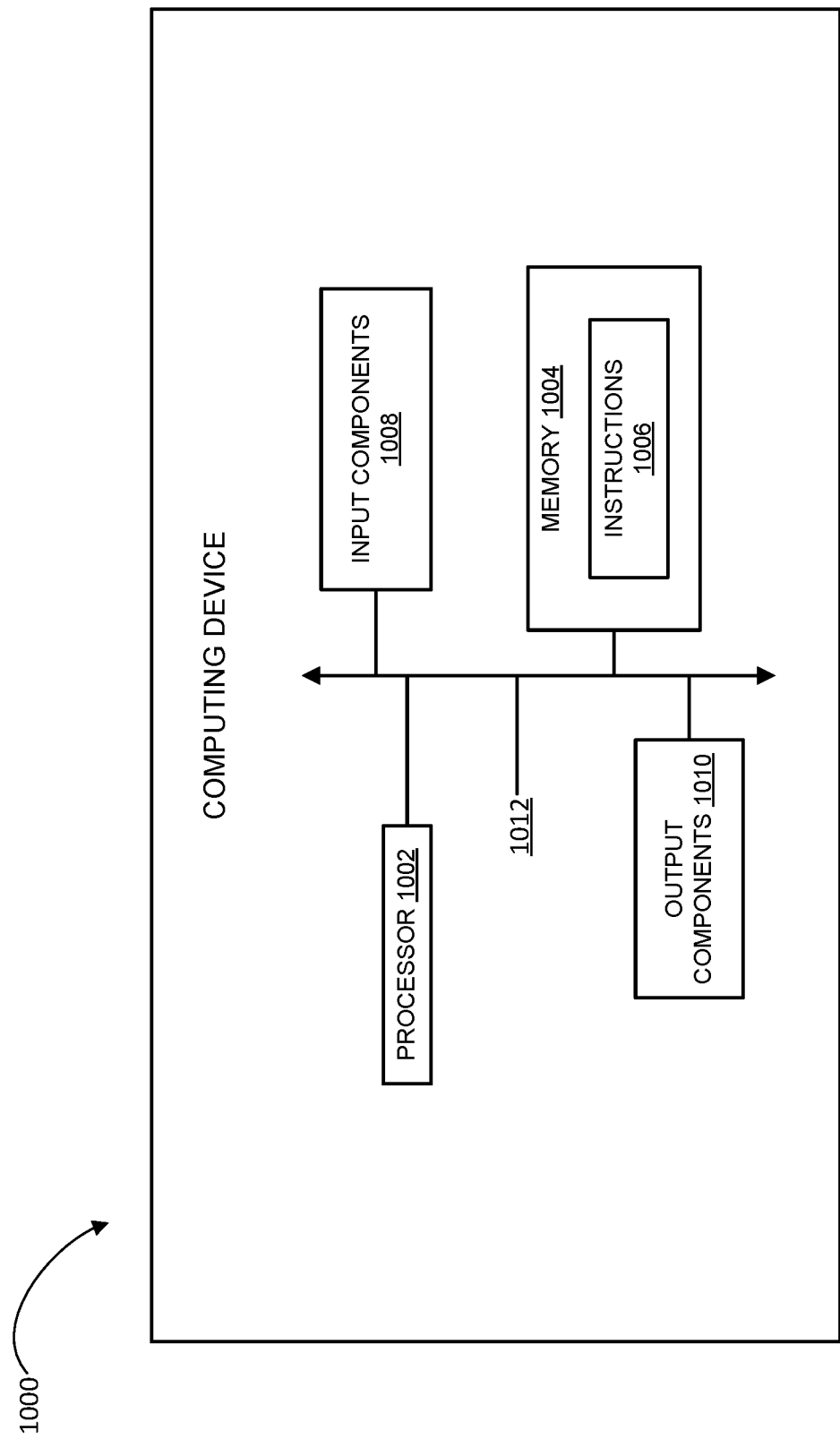
FIG. 10 is a block diagram of an example of a computing device, according to one or more embodiments.

FIG. 10 is a block diagram of an example of a computing device 1000 usable for implementing some aspects of the present disclosure. The computing device 1000 includes a processor 1004 coupled to a memory 1004 via a bus 1012. The processor 1002 can include one processing device or multiple processing devices. Examples of the processor 1002 include a Field-Programmable Gate Array (FPGA), an application-specific integrated circuit (ASIC), a microprocessor, or any combination of these. The processor 1002 can execute instructions 1006 stored in the memory 1004 to perform operations. In some examples, the instructions 1006 can include processor-specific instructions generated by a compiler or an interpreter from code written in any suitable computer-programming language, such as C, C++, C#, Python, or Java.

The memory 1004 can include one memory device or multiple memory devices. The memory 1004 may be non-volatile and include any type of memory device that retains stored information when powered off. Examples of the memory 1004 can include electrically erasable and programmable read-only memory (EEPROM), flash memory, or any other type of non-volatile memory. At least some of the memory 1004 includes a non-transitory computer-readable medium from which the processor 1002 can read instructions 1006. A computer-readable medium can include electronic, optical, magnetic, or other storage devices capable of providing the processor 1002 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 1006.

The computing device 1000 may also include other input and output (I/O) components. The input components 1008 can include a mouse, a keyboard, a trackball, a touch pad, a touch-screen display, or any combination of these. The output components 1010 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein, can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques, including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method performed by a first robot, the method comprising:

receiving, from a computing system and by the first robot, a multi-dimensional representation of a reference aircraft and first control instructions for a first autonomous operation on an aircraft, the multi-dimensional representation comprising a first feature;

collecting, by the first robot, sensor data from a premises at which the aircraft is located;

identifying, by the first robot, the aircraft based on the first feature of the multi-dimensional representation of the reference aircraft and the sensor data;

transmitting, by the first robot and to the computing system, the sensor data;

receiving, by the first robot and from the computing system, second control instructions for a second autonomous operation, the second control instructions based at least in part on the multi-dimensional representation and the sensor data; and performing, by the first robot, the second autonomous operation.

2. The method of claim 1, wherein the first robot uses a first sensor type to collect the sensor data, wherein the second control instructions based at least in part on the multi-dimensional representation and the first sensor type.

3. The method of claim 1, wherein the multi-dimensional representation is a multi-dimensional representation, and wherein the method further comprises:

generating a second multi-dimensional representation of the aircraft based at least in part on the sensor data;

identifying a second feature from the second multi-dimensional representation that corresponds to the first feature of the multi-dimensional representation of the reference aircraft; and determining the aircraft upon which to perform the first autonomous operation based on identifying the second feature from the second multi-dimensional representation.

4. The method of claim 1, wherein the method further comprises:

encrypting the sensor data from the premises at which the aircraft is located, wherein the sensor data is transmitted to the computing system as encrypted sensor data.

5. The method of claim 1, further comprising:

performing the first autonomous operation by at least performing, by the first robot, a first computing operation and causing the computer system to perform a second computing operation associated with the first computing operation.

6. The method of claim 1, wherein the first autonomous operation comprises one of removing a fastener from the aircraft, replacing a fastener on the aircraft, installing a fastener on the aircraft, or decontaminating the aircraft.

7. The method of claim 1, wherein the computing system comprises a server situated at a premises at which the aircraft is located.

8. A first system comprising:

a first robot comprising one or more computer-readable media including instructions that, when executed by one or more processors, configure the first robot to:

receive, from a second system, a multi-dimensional representation of a reference aircraft and first control instructions for a first autonomous operation on an aircraft, the multi-dimensional representation comprising a first feature;

collect, by the first robot, sensor data from a premises at which the aircraft is located;

identify, by the first robot, the aircraft based on the first feature of the multi-dimensional representation of the reference aircraft and the sensor data;

transmit, by the first robot and to the second system, the sensor data;

receive, by the first robot and from the second system, second control instructions for a second autonomous operation, the second control instructions based at least in part on the multi-dimensional representation and the sensor data; and perform, by the first robot, the second autonomous operation.

9. The first system of claim 8, wherein the sensor data is first sensor data, wherein the first system comprises a second robot, wherein the first system further receives second sensor data from a second robot, wherein the first robot uses a first sensor type to collect the sensor data, wherein the second robot uses a second sensor type to collect the second sensor data, and wherein the second control instructions are based on the multi-dimensional representation and the first sensor data and the second sensor data.

10. The first system of claim 8, wherein the multi-dimensional representation is a multi-dimensional representation, and wherein the instructions, when executed by one or more processors, further configure the first system to:

generate a second multi-dimensional representation of the aircraft based at least in part on the sensor data;

identify a second feature from the second multi-dimensional representation that corresponds to the first feature of the multi-dimensional representation of the reference aircraft; and determine the aircraft upon which to perform the first autonomous operation based on identifying the second feature from the second multi-dimensional representation.

11. The first system of claim 8, wherein the instructions, when executed by one or more processors, further cause the first system to:

encrypt the sensor data from the premises at which the aircraft is located, wherein the sensor data is transmitted to the second system as encrypted sensor data.

12. The first system of claim 8, wherein the instructions, when executed by one or more processors, further cause the first system to:

perform the first autonomous operation by at least performing, by the first robot, a first computing operation and causing the first system to perform a second computing operation associated with the first computing operation.

13. The first system of claim 8, wherein the first autonomous operation comprises one of removing a fastener from the aircraft, replacing a fastener on the aircraft, installing a fastener on the aircraft, or decontaminating the aircraft.

14. The first system of claim 8, wherein the second system comprises a server situated at a premises at which the aircraft is located.

15. One or more non-transitory computer-readable media including stored thereon instructions that, when executed by one or more processors, causes a first system to:

receive, by a first robot of the first system and from a second system, a multi-dimensional representation of a reference aircraft and first control instructions for a first autonomous operation on an aircraft, the multi-dimensional representation comprising a first feature;

collect, by the first robot, sensor data from a premises at which the aircraft is located;

identify, by the first robot, the aircraft based on the first feature of the multi-dimensional representation of the reference aircraft and the sensor data;

transmit, by the first robot and to the second system, the sensor data;

receive, by the first robot and from the second system, second control instructions for a second autonomous operation, the second control instructions based at least in part on the multi-dimensional representation and the sensor data; and perform, by the first robot, the second autonomous operation.

16. The one or more non-transitory computer-readable media of claim 15, wherein the sensor data is first sensor data, wherein the first system comprises a second robot, wherein the first system further receives second sensor data from a second robot, wherein the first robot uses a first sensor type to collect the sensor data, wherein the second robot uses a second sensor type to collect the second sensor data, and wherein the second control instructions are based on the multi-dimensional representation and the first sensor data and the second sensor data.

17. The one or more non-transitory computer-readable media of claim 15, wherein the instructions, when executed by the one or more processors, further cause the first system to:

generate a second multi-dimensional representation of the aircraft based at least in part on the sensor data;

identify a second feature from the second multi-dimensional representation that corresponds to the first feature of the multi-dimensional representation of the reference aircraft; and determine the aircraft upon which to perform the first autonomous operation based on identifying the second feature from the second multi-dimensional representation.

18. The one or more non-transitory computer-readable media of claim 15, wherein the instructions, when executed by the one or more processors, further cause the first system to:

encrypt the sensor data from the premises at which the aircraft is located, wherein the sensor data is transmitted to the second system as encrypted sensor data.

19. The one or more non-transitory computer-readable media of claim 15, wherein the instructions, when executed by the one or more processors, further cause the first robot to:

perform the first autonomous operation by at least performing, by the first robot, a first computing operation and causing the first system to perform a second computing operation associated with the first computing operation.

20. The one or more non-transitory computer-readable media of claim 15, wherein the first autonomous operation comprises one of removing a fastener from the aircraft, replacing a fastener on the aircraft, installing a fastener on the aircraft, or decontaminating the aircraft.

* * * * *